Figure 23:
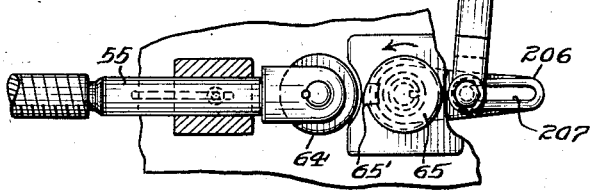

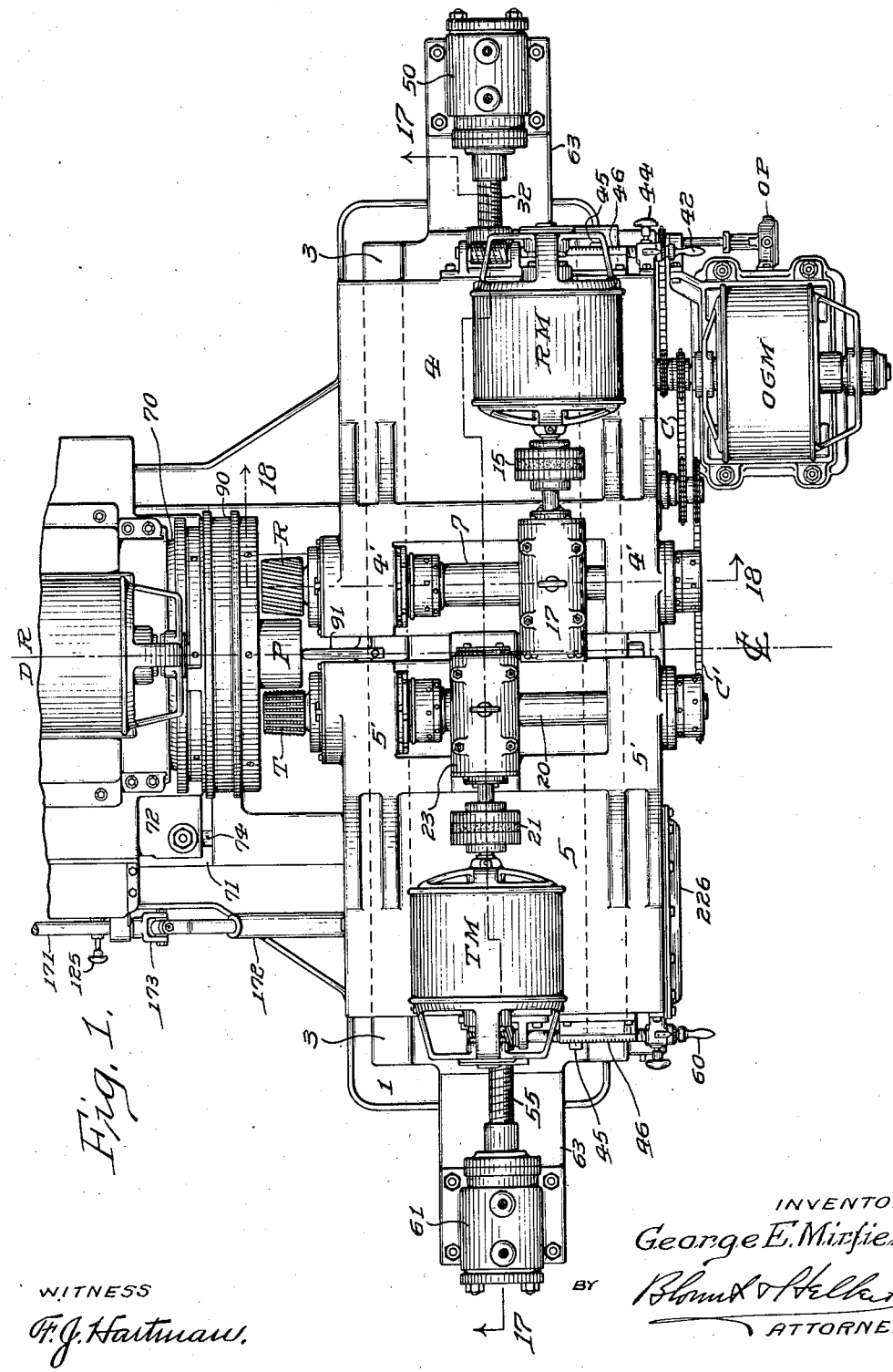

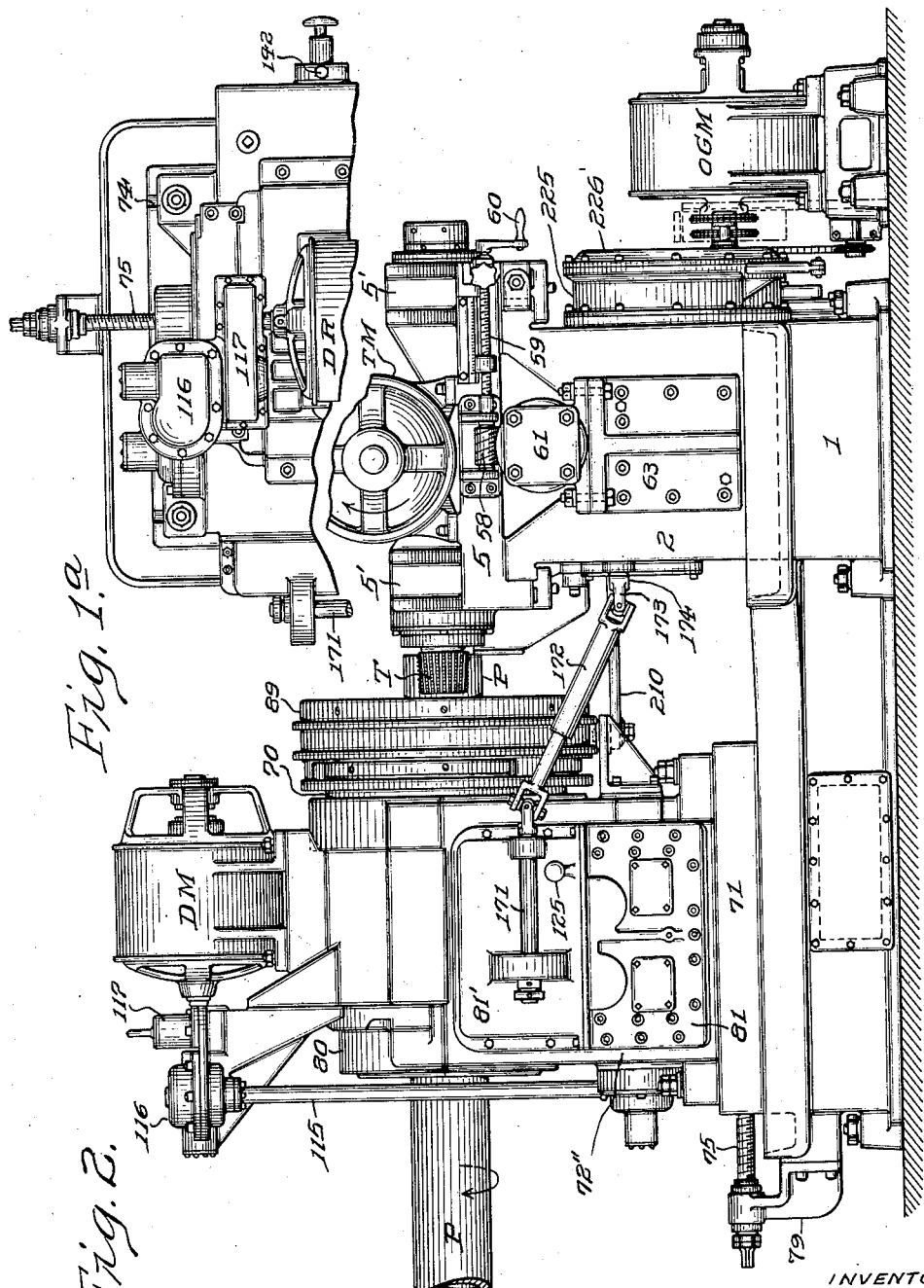

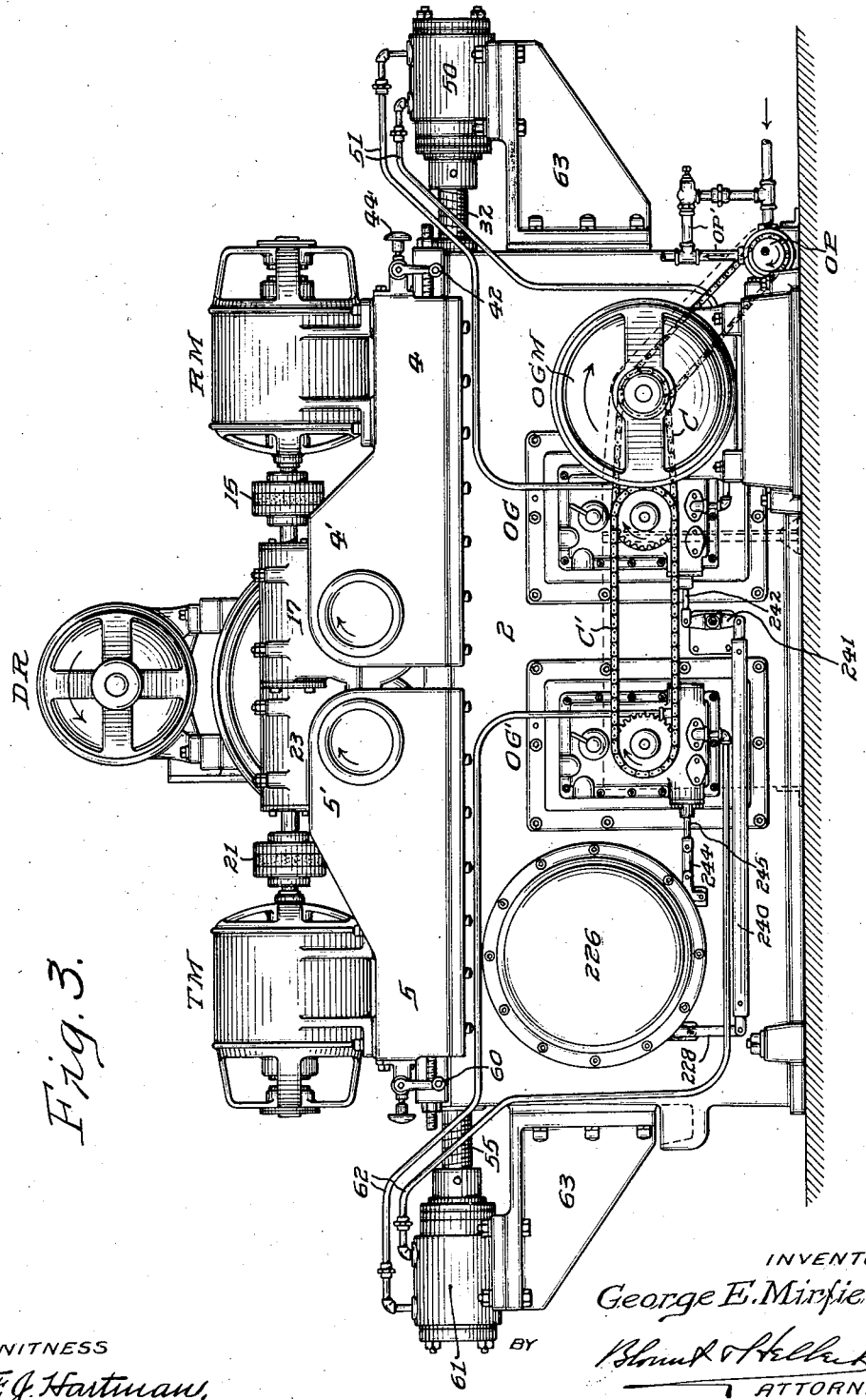

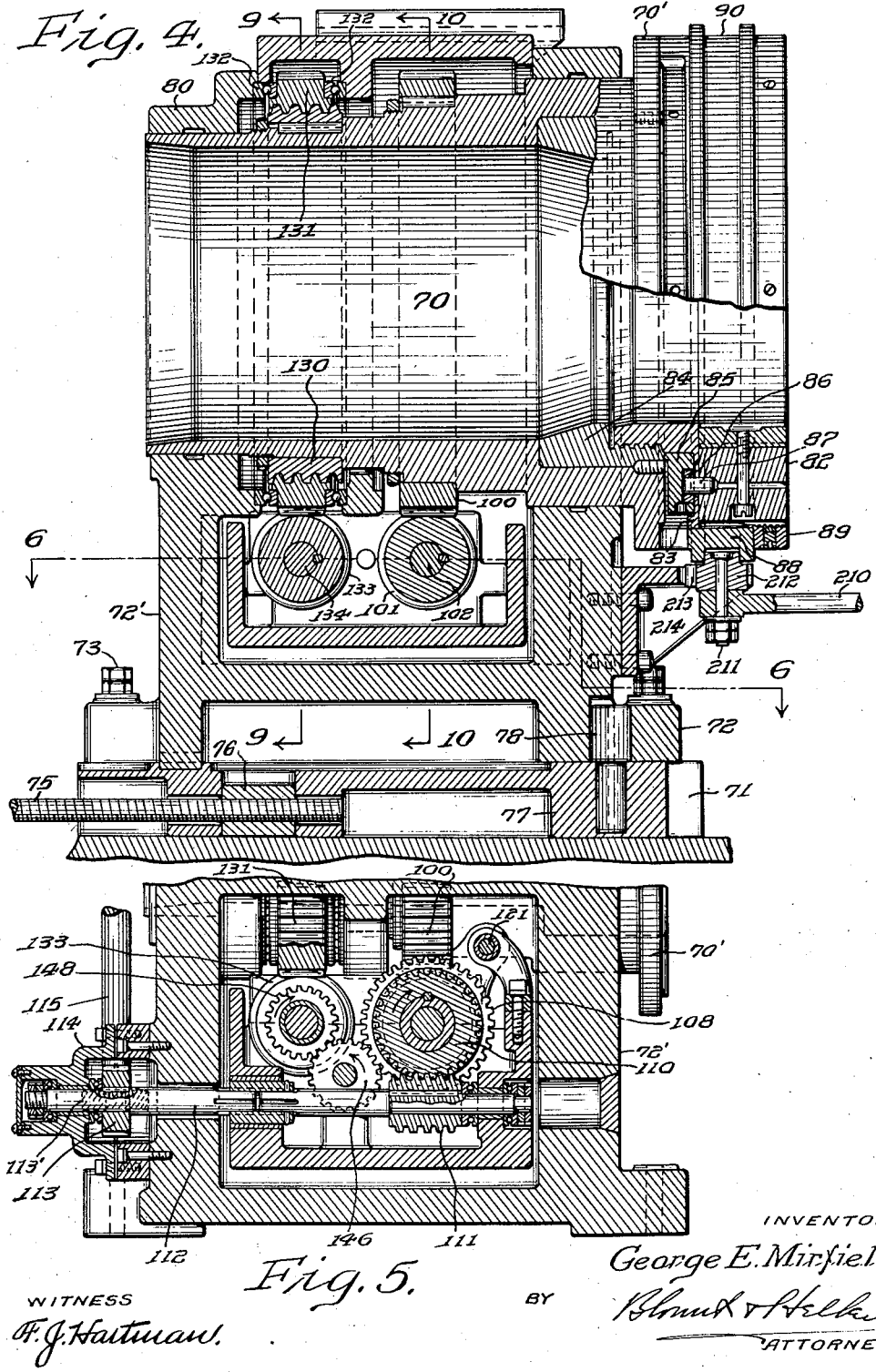

Jan. 28, 1930.  G. E. MIRFIELD  1,745,035
MACHINE FOR MILLING THREADS
Filed Nov. 1, 1927  11 Sheets-Sheet 5
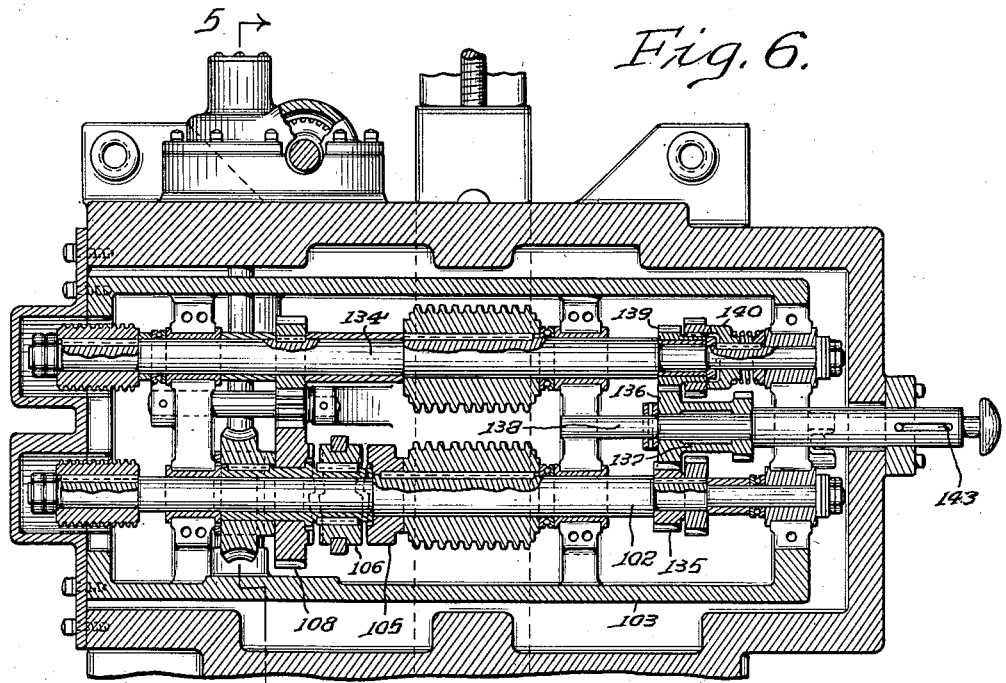
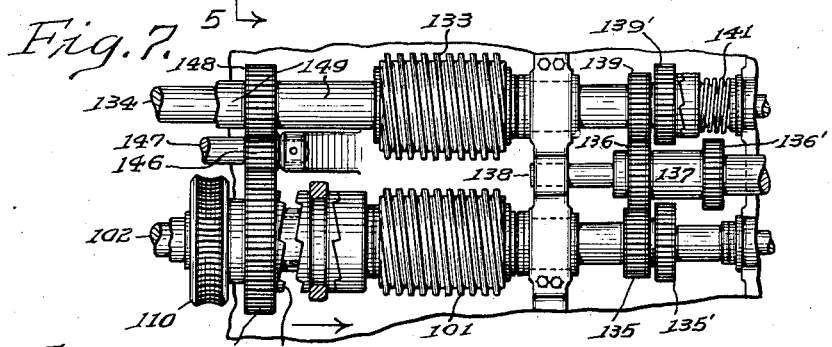
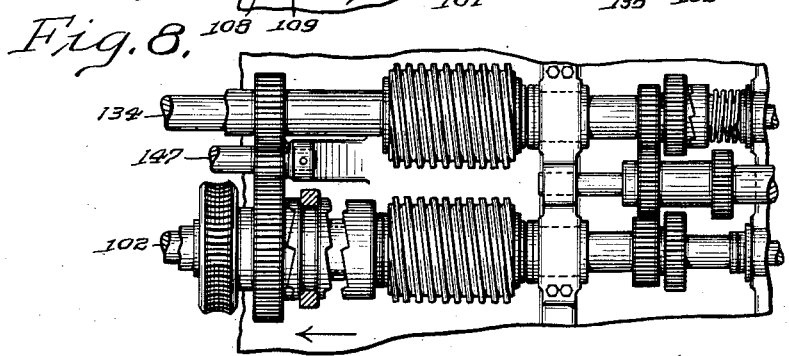
INVENTOR
George E. Mirfield.

Jan. 28, 1930. G. E. MIRFIELD 1,745,035
MACHINE FOR MILLING THREADS
Filed Nov. 1, 1927 11 Sheets-Sheet 6
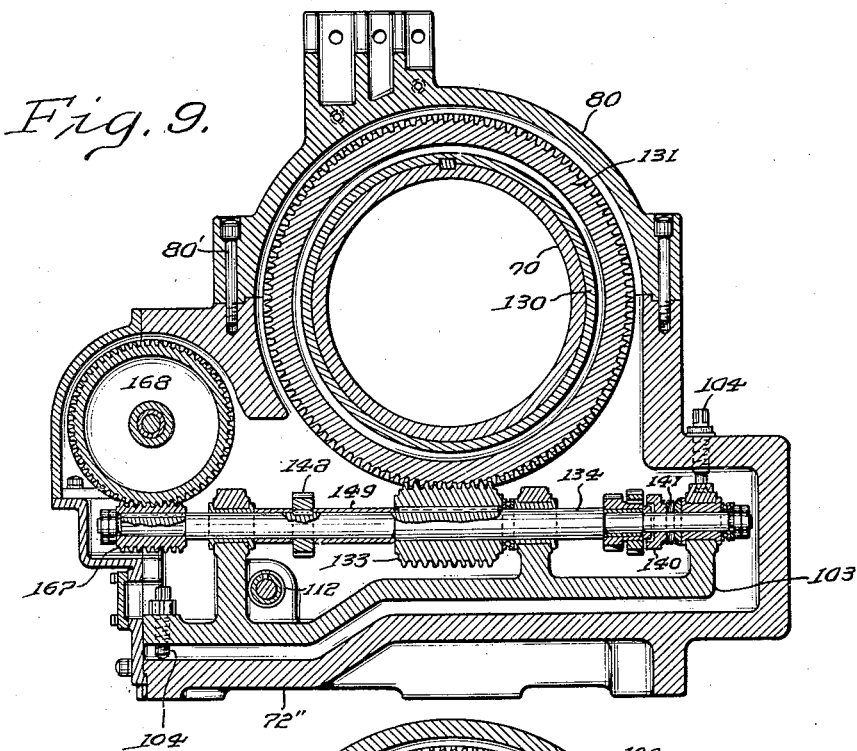
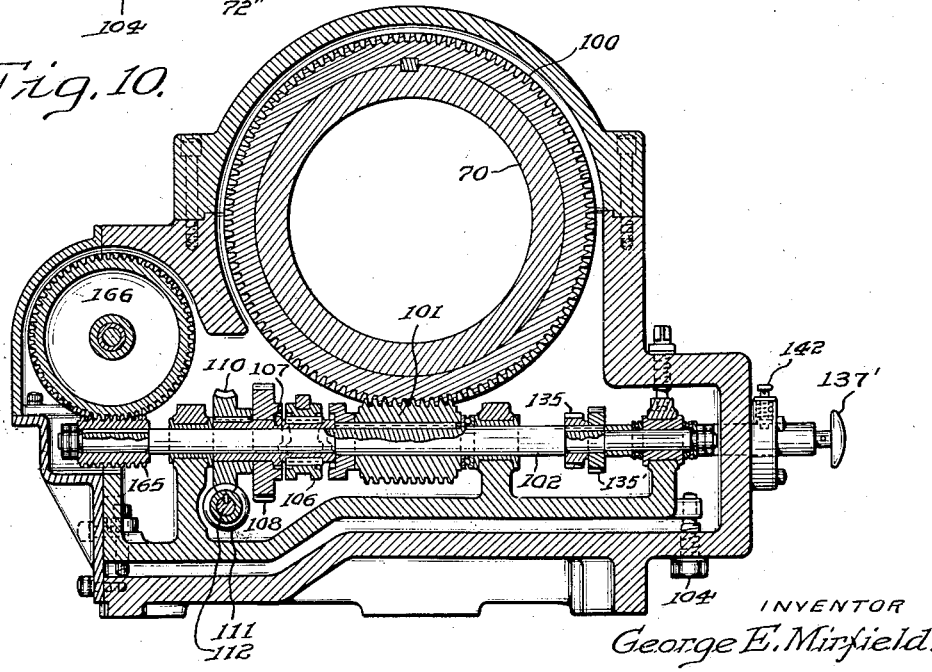
INVENTOR
George E. Mirfield.

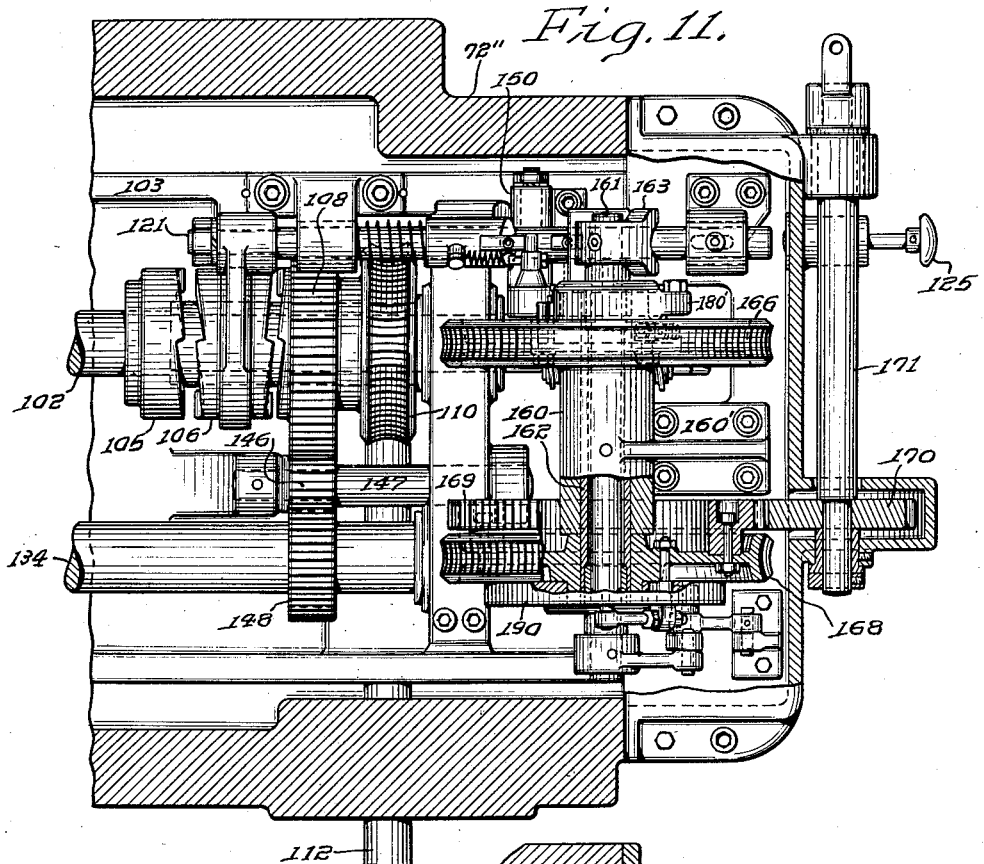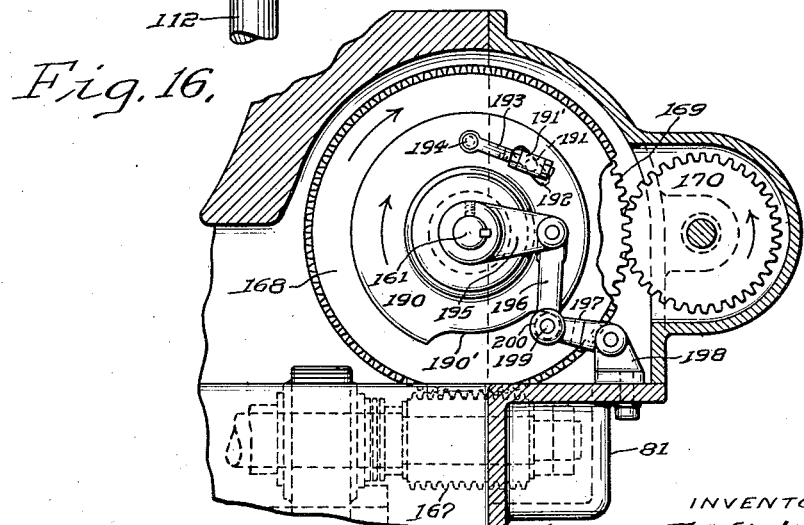

Jan. 28, 1930. G. E. MIRFIELD 1,745,035
MACHINE FOR MILLING THREADS
Filed Nov. 1, 1927 11 Sheets-Sheet 8
Fig. 12.
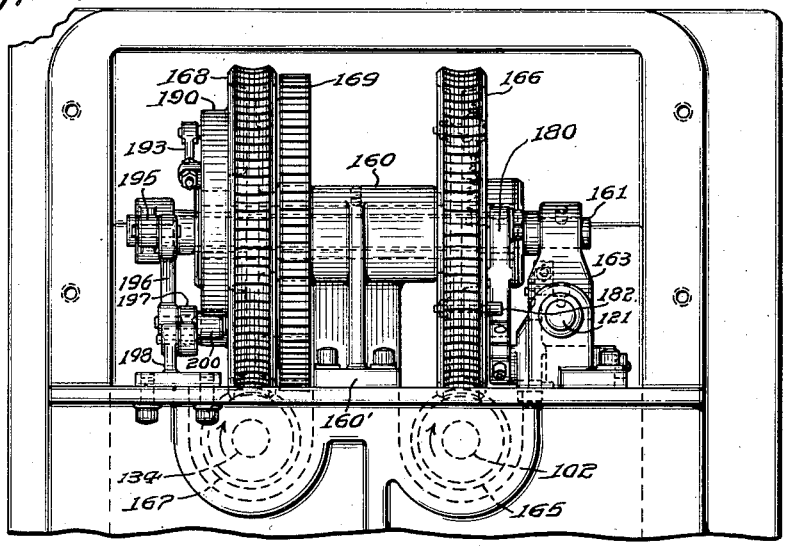
Fig. 24. 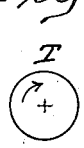 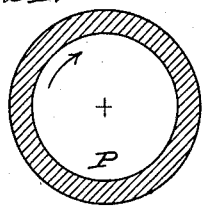 Fig. 24.ᵃ 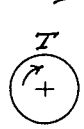 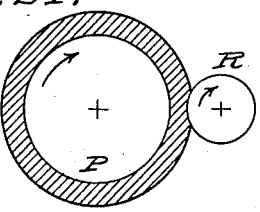
Fig. 24.ᵇ 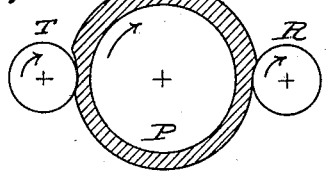 Fig. 24.ᶜ 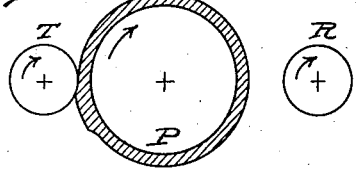

INVENTOR
George E. Mirfield.
WITNESS
F. J. Hartman.
BY
Blount & Welch
ATTORNEYS

Jan. 28, 1930.                     G. E. MIRFIELD                     1,745,035
                           MACHINE FOR MILLING THREADS
                       Filed Nov. 1, 1927          11 Sheets-Sheet 9
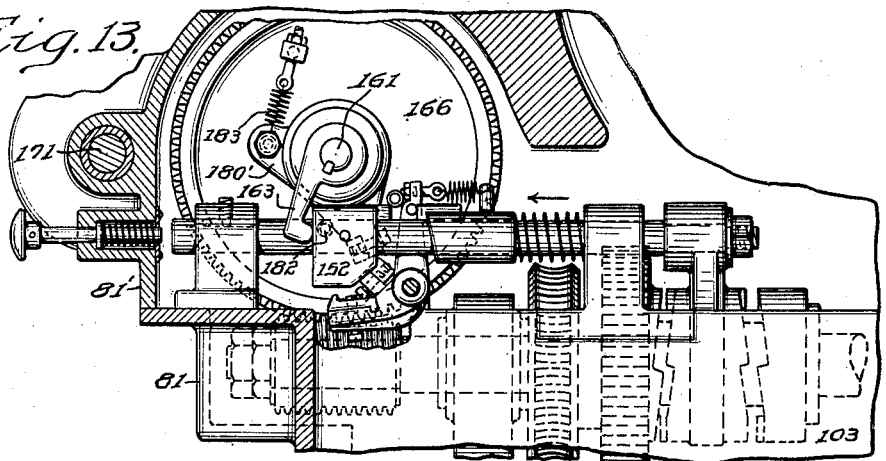
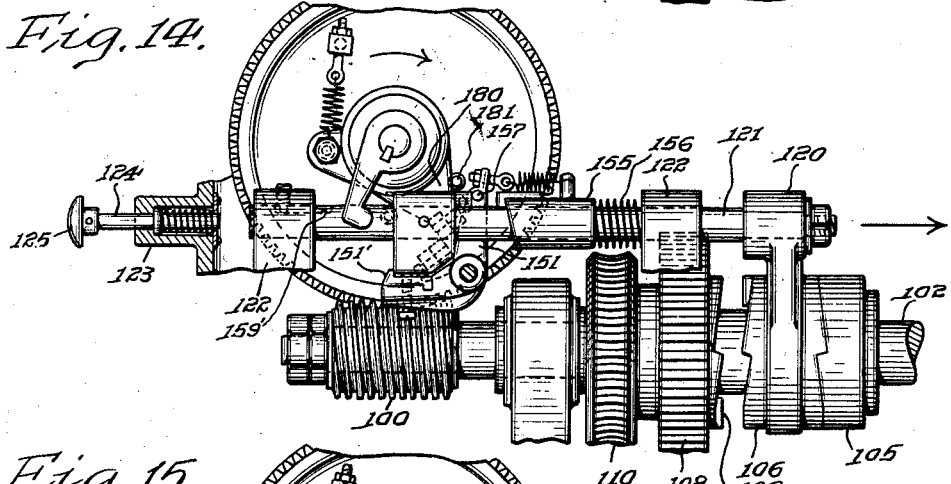
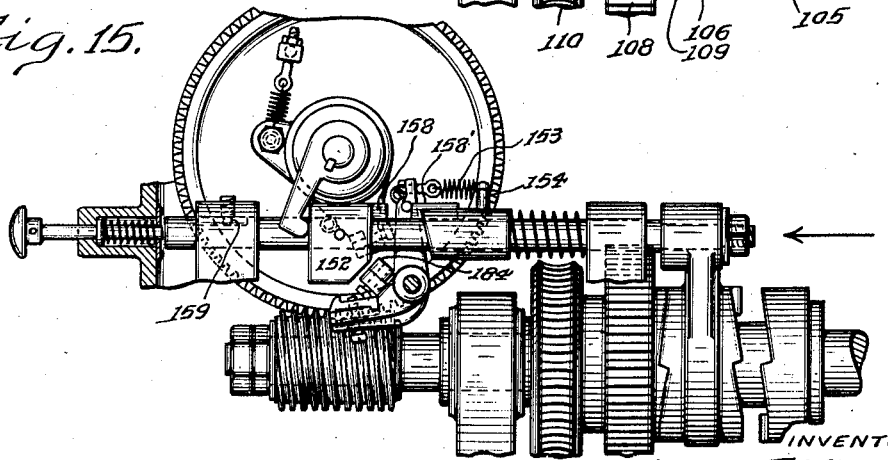
INVENTOR
George E. Mirfield.
WITNESS                                BY
                                                    ATTORNEYS Jan. 28, 1930.  G. E. MIRFIELD  1,745,035
MACHINE FOR MILLING THREADS
Filed Nov. 1, 1927  11 Sheets-Sheet 10
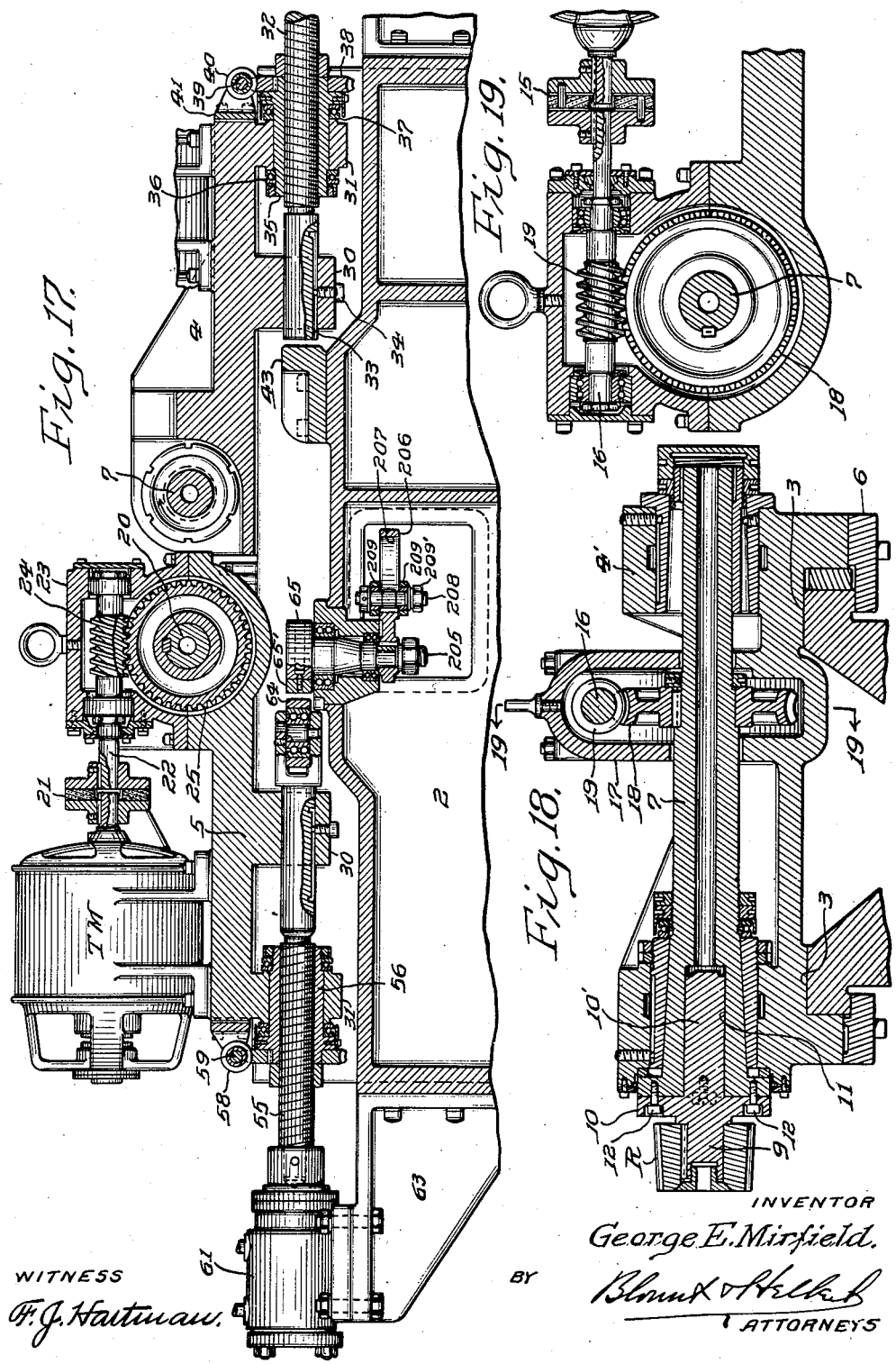
INVENTOR
George E. Mirfield.
BY
ATTORNEYS
WITNESS
F. J. Hartman.

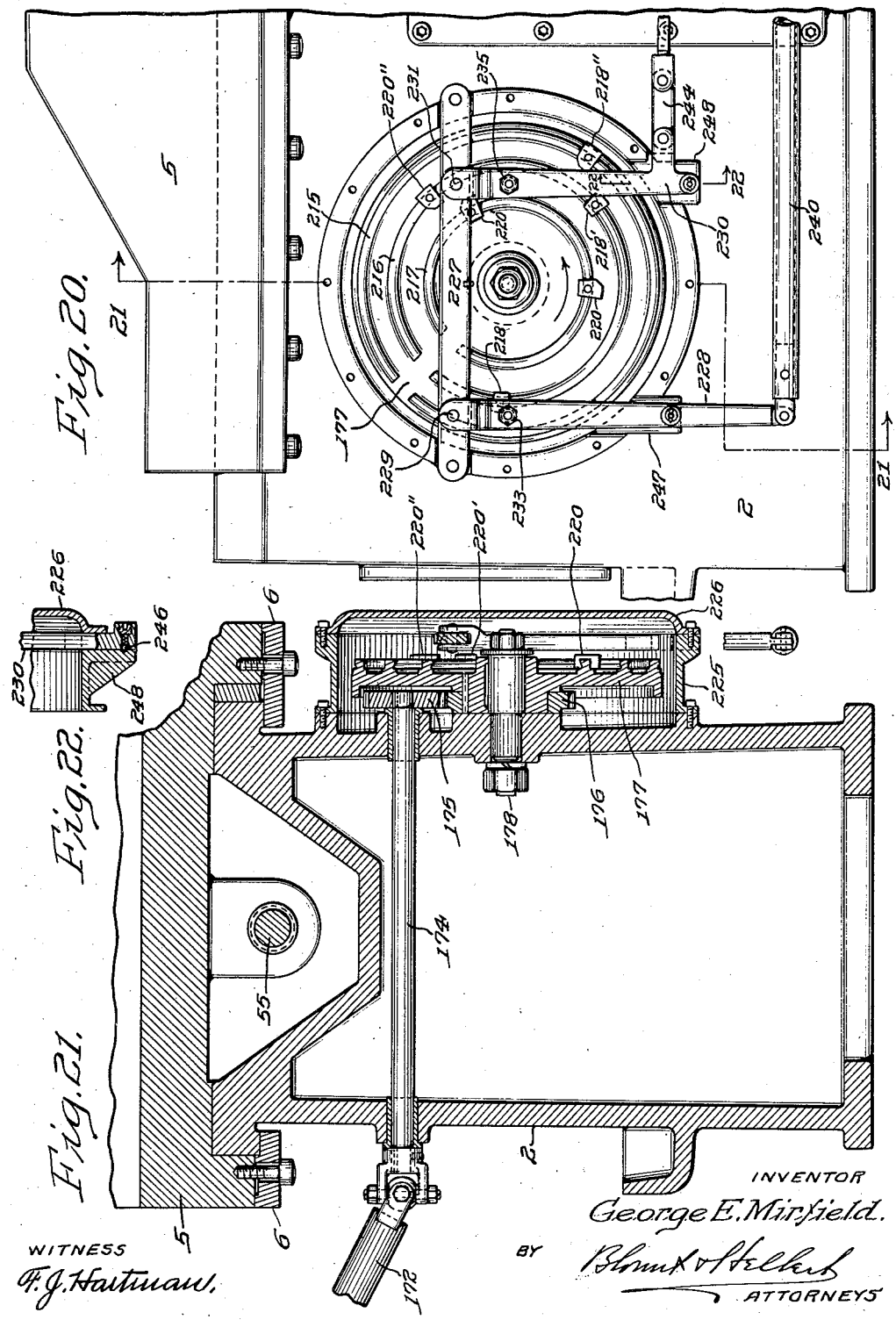

Patented Jan. 28, 1930

1,745,035

UNITED STATES PATENT OFFICE

GEORGE E. MIRFIELD, OF YOUNGSTOWN, OHIO

MACHINE FOR MILLING THREADS

Application filed November 1, 1927. Serial No. 230,226.

Machines constructed in accordance with my invention are particularly adapted for forming threads on the ends of pipes and tubes and I will more especially refer hereinto their employment for that purpose, it being, however, understood that such machines are capable of being utilized for other purposes as well, such as forming threads or performing other milling operations on the ends of rods or other articles of like character.

In United States Letters Patent No. 1,611,-122 granted to me December 14, 1926, I disclosed and claimed a novel method for milling threads on pipes, tubes and the like, as well as one form of machine adapted for the performance of the said method, while in an application for United States Letters Patent filed by me November 29, 1926, I disclosed and claimed another form of machine operable in accordance with the said method; the present invention relates to still another form of machine also operable in accordance with said method in its broader aspects and in some respects constituting an improvement over the prior machines to which reference has just been made, and, consequently, contemplates the provision of a machine adapted for the production of smooth and accurate threads, either straight or tapered, with a minimum expenditure of time and labor and within the tolerances and of the standards required in modern machine shop practice. Further objects, novel features, characteristics and improvements comprehended by the invention will hereinafter more fully appear.

As in the earlier machines to which I have referred, I employ in a machine constructed in accordance with the present invention, a plurality, conveniently a pair, of rotatable milling cutters respectively of suitable character to impart to the work a roughing cut of sufficient depth to remove the scale and true the surface which is to be threaded and to form the desired threads thereon, and so arrange these cutters in their relation to each other and to the work that the roughing cutter will operate on the rotating work at a point in advance of that at which the threading cutter operates thereon with the result that the threading cutter is relieved from the duties of penetrating the scale and truing the work and relegated to the sole duty of cutting into the clean metal exposed by the roughing cut for a depth sufficient to form the required threads, thereby contributing to their accuracy and materially enhancing the life of the cutter.

Moreover, for the production of tapered threads, I employ cutters tapered longitudinally with respect to their axes of rotation in conformity with the taper of the thread which it is desired to produce and of substantially the length of such thread, and provide the threading cutter with a plurality of annular teeth having the profile of the form of the desired thread but no pitch so that by effecting substantially a single revolution of the work with respect to this cutter and simultaneously moving the work longitudinally for a distance substantially equal to the pitch of the thread to be cut while effecting slight relative movement between the work and the cutter in a direction substantially normal to the axis of the latter, a complete and accurate tapered spiral thread of the desired length will be formed in the work.

For effecting these results I therefore provide a machine which in its preferred embodiment comprises, among other things, separate roughing and threading cutters and means for supporting, adjusting and driving both cutters in a manner to avoid disalignment or looseness thereof with consequent chattering and resulting imperfection in the work; means for feeding the roughing cutter to depth in the work; means for feeding the threading cutter to depth in the work after the roughing cutter has traversed a limited portion thereof and rendered it suitable for the reception of the threading cutter; means for chucking and centering the work, for imparting rotation thereto and for effecting the requisite relative longitudinal movement between the work and the threading cutter necessary for the production of a continuous spiral thread when employing a cutter having form teeth without pitch; means for effecting gradual relative movement between the threading cutter and the work in a direction substantially normal to the longitudinal axis of the latter to thereby enable the production of accurate tapered threads by adequately compensating for the difference in radial magnitude of different portions of the complete thread; means for effecting the return of certain of the parts to initial or starting position following the completion of the threading of one piece of work to thereby place the machine in condition for the reception of the following piece and means for substantially automatically effecting the requisite movements of the cutters and other various elements and parts in suitably timed and correlated relation with each other from the initiation to the completion of the threading cycle as performed on each consecutive piece of work from the time of its introduction into the machine to the time of its removal therefrom.

To enable those skilled in the art to comprehend and practice the invention, I have illustrated in the accompanying drawings and will now proceed to describe one form of the machine constructed in conformity with the principles thereof, it being however to be distinctly understood that means and instrumentalities other than those to which reference will be made may be utilized if desired without departing from the spirit and scope of the invention; I therefore do not in any way confine or limit myself in the practice of the invention to the employment of the specific features of design, construction and arrangement of the particular machine herein disclosed.

Referring now to the drawings, Figs. 1 and 1ª together constitute a top plan view of the machine, the portion shown in Fig. 1ª being omitted from Fig. 1 for lack of space; Fig. 2 is a front elevation of the machine and Fig. 3 is an elevation of the right hand end of the machine as viewed from the front. Fig. 4 is an enlarged view of the work container and adjacent parts, principally in central vertical longitudinal section, and Fig. 5 is a fragmentary vertical section on line 5—5 in Fig. 6. Fig. 6 is a horizontal staggered section on line 6—6 in Fig. 4; Figs. 7 and 8 are fragmentary top plan views of certain of the parts shown in Fig. 6 but in different positions, and Figs. 9 and 10 are respectively transverse vertical sections on lines 9—9 and 10—10 in Fig. 4, these two figures, however, being on a slightly smaller scale than Fig. 4. Fig. 11 is a fragmentary view, partially in plan and partially in horizontal section, of the container drive clutch shifting mechanism and adjacent parts and Fig. 12 is a front view in elevation of a portion of said mechanism with the cap which normally covers the same removed. Figs. 13, 14 and 15 are respectively fragmentary detail views of certain portions of the clutch shifting mechanism viewed as when looking to the left in Fig. 12, the clutch being shown in these views in different positions and Fig. 16 is a somewhat similar view but looking to the right in Fig. 12. Fig. 17 is a fragmentary vertical transverse section on line 17—17 in Fig. 1 but on an enlarged scale, Fig. 18 a fragmentary vertical section on line 18—18 in Fig. 1 but on a still larger scale and Fig. 19 a vertical section on line 19—19 of Fig. 18. Fig. 20 is an enlarged fragmentary elevation of a portion of the right hand end of the machine showing certain parts of the timing mechanism, the cap normally covering the same and which is shown in position in Fig. 3, being removed, and Fig. 21 is a vertical section on line 21—21 of Fig. 20. Fig. 22 is a fragmentary detail section on line 22—22 of Fig. 20 and Fig. 23 a fragmentary plan view of portions of the mechanism through which the requisite movement of the threading cutter in a direction substantially normal to the axis of the work is effected in the production of a tapered thread. Figs. 24, 24ª, 24ᵇ and 24ᶜ are respectively diagrammatic views showing the relative positions of the cutters and the pipe at different times during the threading cycle. The arrows on the section lines in all cases indicate the direction in which the sections are taken and the same symbols are employed to designate the same parts in the various figures. Moreover, no attempt has been made in the drawings to illustrate the wiring or switches comprising the circuits in which the several motors are included nor the oil cups or other means provided for effecting adequate lubrication of the various moving parts.

As comprehension of the construction and operation of the machine will be facilitated by reference at this point to its general arrangement I shall therefore first briefly refer to its

General assembly

The base 1 of the machine is provided adjacent one end with a vertically extending pedestal 2 which may for convenience be cast hollow and integral with the base. At the upper end of this pedestal are disposed a pair of heads which are respectively slidable horizontally toward and away from the center line C/L of the machine indicated on Fig. 1. One of these heads is operative to support the roughing cutter spindle and the driving mechanism therefor including a driving motor which is mounted on the head while the other head is operative to similarly support the threading cutter spindle together with its driving mechanism and driving motor. Preferably fluid actuated means are also provided for reciprocating each of the heads upon the pedestal, the operation of said means being controlled through suitable timing mechanism so as to bring about the desired movements of the heads at proper times in the threading cycle.

The cutter spindles are so arranged that the cutters respectively carried thereby will lie substantially midway between the ends of the base and of course at a considerable elevation thereabove while disposed adjacent the opposite end of the base from that at which the pedestal is positioned are the means for holding the work and imparting to it the requisite movements of rotation and translation, generally corresponding to the mechanism which in my aforesaid application, Serial No. 151,281, I have termed the "fixture". Said means comprise, generally speaking, a hollow container through which the work extends so that the end which is to be threaded will project between the cutters, a chuck carried by the container and operative to grip the work and constrain it to rotate with the container and a housing in which the container is journaled, in association with driving mechanism operative to rotate the container and simultaneously cause longitudinal movement thereof while the thread is being cut and to then effect a quick return of the container to initial or starting position by moving it longitudinally in the opposite directon while it is prevented from rotation, these several movements together with the requisite movements of the cutters being effected through the medium of the timing mechanism, to which reference has already been made, and which is so interconnected with the container drive and return mechanism as well as the cutter feeding mechanism that the various movements of the container and cutters are brought about in properly timed relation with each other.

With this general description in mind reference may now be made more specifically to the various elements of the machine.

*Cutter heads and adjacent mechanism*

The pedestal 2 is provided with longitudinally spaced transversely extending horizontal ways 3 upon which the heads 4 and 5 are slidably held in position by overhanging flanges formed on the heads and keepers 6 secured thereto and extending beneath the ways (Fig. 21). The head 4 which supports the roughing cutter R has a pair of integral longitudinally spaced inwardly overhanging arms 4' in which the roughing cutter spindle 7 is journaled in suitable bearings preferably of the taper collet type or other type capable of adjustment to compensate for radial as well as longitudinal wear or end play as it is most important for the production of a satisfactory thread that the spindles be constrained to run absolutely true. The construction and mounting of the roughing cutter spindle which I prefer to employ are very clearly illustrated in Fig. 18 and require no extended description as they will be clearly understood by those familiar with the art; it will be noted, however, that instead of mounting the roughing cutter R directly on an integral extension of the spindle I prefer to mount the cutter as shown in said figure on a cylindrical boss or extension 9 integral with a face plate 10 having on its opposite side an integral plug 10' which seats in a bore 11 in the end of the spindle, the face plate being removably secured on the latter by bolts 12 so that it may be readily taken off. This arrangement is of advantage in that it permits the face plate and parts integral therewith and which form the actual mounting for the cutter to be hardened and accurately ground, thereby insuring the proper alignment of the cutter with the spindle, while in case of damage to the mounting the latter may be readily replaced without replacing the entire spindle, as would be necessary if the cutter were mounted directly thereon.

The drive of the roughing cutter spindle is effected from a motor RM which is mounted on the head 4 and through a flexible coupling 15 drives a worm shaft 16 journaled in a housing 17 mounted over the spindle 7 which in turn carries a worm gear 18 cooperative with a worm 19 on the shaft. It is thus apparent that the drive of the spindle is effected very directly from the motor, the necessary speed reduction being brought about solely through the worm and worm gear; consequently the rotation of the spindle is extremely smooth and without backlash or lost motion.

The arrangement and drive of the threading cutter spindle 20 are substantially the same as that of the roughing cutter spindle just described, the threading cutter spindle being mounted in arms 5', extending from the head 5 and driven in like manner from a motor TM carried by that head through the medium of a coupling 21, and worm shaft 22, journaled in a housing 23 and carrying a worm 24 cooperative with a worm gear 25 keyed to the spindle 20.

It will thus be apparent that the mounting of both spindles is extremely rigid, the bearings of the spindles being relatively widely separated longitudinally and the arms in which they are disposed being very heavy and integral with their respective heads and thus substantially incapable of distortion, while the means employed for driving the spindles are extremely simple and of such nature that lost motion or back-lash is entirely eliminated; additionally as the worm gears are of relatively great diameter compared with the diameter of the cutters R and T, the point of application of power to the gears is at a much greater distance from the axes of the spindles than are the points at which the cutters engage the work, in consequence of which any slight errors or imperfections in the gears and worms are not duplicated directly in the work but if they appear therein at all, appear in a reduced amount. I therefore consider my method and means of mounting and driving the cutter spindles as an extremely important improvement in the art, for as a result thereof a much more perfect and finer appearing thread and one which is devoid of chatter marks and other imperfections can be produced; on the other hand said mounting and driving means are of an extremely simple character, comprise but few parts, are not liable to get out of order and require adjustment only at long intervals.

Cutter feeding means

In accordance with the present invention, the axes of the cutter spindles and in turn of the cutters are disposed in the same horizontal plane as the axis of the work and the cutters are arranged to operate on the latter at opposite ends of its horizontal diameter. Towards the end of each threading cycle, as hereinafter described, the cutters are moved outwardly away from the threaded work to permit its withdrawal from the machine and the insertion of the following piece respectively and it is therefore requisite after the piece has been chucked to first move the roughing cutter into engagement therewith, thereafter, at the expiration of a predetermined interval, to move the threading cutter into like engagement, to then, after a further interval retract the roughing cutter to initial position after it has completed its duty and finally to similarly retract the threading cutter, thus again placing both cutters in such position that the threaded work may be withdrawn from the machine and the next piece of work inserted between the cutters. Additionally, to enable the machine to be used for threading pipe of different diameters, means must be provided to enable the cutters to be properly set for operation on the different sizes and also for different depths of cut on the same size of pipe, and reference will now be made thereto as well as to the means for moving the heads in and out after the cutters have been initially set.

As best shown in Fig. 17, the head 4 is provided with a pair of depending lugs 30 and 31, through which extends an adjusting shaft 32 provided at its inner end with a keyway 33; this end of the shaft extends through the lug 30 and is prevented from turning therein by a set screw 34 whose point projects into the keyway. Adjacent to lug 31 the shaft is externally threaded and is surrounded by an internally threaded sleeve 35 extending through and rotatable in the lug 31 and ball thrust bearings 36 and 37 are disposed on opposite sides of the lug between a shoulder 35' and a nut 35 on the sleeve. Adjacent the outer end of the sleeve whereby endwise movement of the latter is prevented a worm gear 38 is keyed thereto while a worm shaft 39, carrying a worm 40 is journaled in a bracket 41 secured to an adjacent portion of the head, this shaft being rotatable by a crank 42 positioned at its outer extremity. Thus, by rotation of the crank, sleeve 35 can be correspondingly rotated upon the threaded portion of adjusting shaft 32 so as to move the latter longitudinally, said shaft being incapable from rotation on its own axis as above described. Consequently, the inner end of the shaft 32 projecting through the lug 30 may in this manner be moved toward or away from a fixed stop 43 bolted to the upper surface of the pedestal beneath the head in alignment with the shaft. As the reduction effected between the rotational speed of the shaft 39 and sleeve 35 is considerable and since for each revolution of the sleeve the longitudinal movement of adjusting shaft 32 is very small, the threads on the shaft 32 being preferably of relatively low pitch, a single revolution of the crank effects a very fine adjustment of the adjusting shaft 32 so that in effect a micrometer adjustment thereof is provided. Preferably a locking screw 44 is arranged to hold the shaft 39 in adjusted position, while, as shown, the shaft may be threaded and provided with an indicator 45 cooperative with a suitably positioned scale 46 in such manner that as the shaft is rotated the indicator will travel therealong and thus give a visible indication of the adjusted position of adjusting shaft 32.

It will be apparent from the foregoing that the possible inward movement of the head 4 is limited by engagement of the end of the adjusting shaft with stop 43 so that the further the head is moved inwardly on the adjusting shaft, the further will the head move inwardly toward the center line of the machine before its progress is arrested. For effecting the inward and outward movement of the head, fluid operated means are preferably employed, comprising a cylinder 50 enclosing a piston connected with the outer end of adjusting shaft 32 and supplied with oil or other fluid under pressure on opposite sides of the piston by means of pipes 51, extending to an oil gear pump which, together with the necessary valve mechanism for effecting reversal of direction of flow through the pipes, is enclosed in a housing generally designated as OG bolted to the end face of the pedestal or other convenient point of support. As oil gear pumps of this character are well known and in common use and as the same forms no part of the present invention, save as one of the component elements of the operative combination of the machine, extended description thereof would be superfluous. Power for operating the oil gear pump may be supplied by a suitably positioned motor OGM through a driving chain C, this motor being also conveniently utilized for driving a lubricating oil pump OP from which, through the medium of suitable piping OP', a circulation of oil or other lubricant is directed over the cutters and other parts of the machine.

Substantially similar mechanism is utilized for adjustably limiting the inward movement of the threading cutter head 5, comprising, in brief, an adjusting shaft 55, sleeve 56, worm 58, shaft 59 and crank 60, while a cylinder 61 having a piston connected with the shaft 55 and in turn connected by piping 62 with another oil gear pump OG' driven from motor OGM by a chain C' is arranged in like manner for moving the head in and out. The cylinders 50 and 61 are respectively mounted on suitable brackets 63 secured to opposite faces of the pedestal.

It should be noted, however, that the inner end of the adjusting shaft 55 does not cooperate with a fixed stop corresponding to the stop 43 but is forked and provided with a cam roll 64 cooperative with a cam 65 which acts as a stop to limit the inward movement of the head in a manner generally similar to stop 43 with respect to the roughing cutter head. The function of cam 65 and adjacent mechanism will hereinafter more fully appear.

It will thus be evident, particularly from an inspection of Fig. 17, that by suitable adjustment of the adjusting shafts 32 and 55 the extent to which the roughing and threading cutter heads can move inwardly may be varied as desired, and further, that when high pressure fluid is supplied to the pipes leading to the outer ends of the cylinders 50 and 61, the heads will be moved inwardly until their progress is arrested by engagement of their respective adjusting shafts with stop 43 and cam 65 and that so long as the pressure is maintained on the outer sides of the pistons the adjusting shafts will be continuously urged against the stop and cam, but as soon as the fluid pressure is released from the outer side of the pistons and exerted against the inner sides thereof, the heads will move outwardly in opposite directions from the center line of the machine for a distance determined by the possible outward movement of the pistons in the cylinders.

I have found in practice that the use of fluid operated means of the general character of those to which reference has been made is extremely satisfactory for effecting the requisite movement of the heads, but I do not confine myself exclusively to the use of such means as other means may be utilized for that purpose if desired.

Container mechanism

Reference will now be made to the container, as I prefer to term the hollow cylindrical element 70, through which the work extends when in operative position in the machine, as well as to the adjacent mechanism through which the container is supported and the means for gripping and holding the work relatively immovable with respect to the container.

The container is supported on a pad 71 which is integral with the main base 1 adjacent the opposite end thereof from the pedestal and upon which rests the container housing base 72 adapted to be secured to the pad by bolts 73 having heads arranged to slidably engage in undercut slots 74 in the pad. To enable adjustment of the container housing towards or away from the pedestal, an adjusting screw 75 is provided which coacts with a nut 76 disposed in a recess formed in a heavy block or bar 77 extending under the center of the housing base 72 in a groove in the pad and connected to the housing base by a heavy vertically extending pin 78. The outer end of the screw projects through and is prevented from longitudinal movement in a bracket 79 secured to the base 1, so that by rotating the screw, the bar, and in turn the base 72 through its connection to the bar by pin 78, can be moved in or out when the bolts 73 are loosened.

The container is rotatably journaled in a hollow housing 72' rising from the housing base and adapted to support a substantially semi-cylindrical hollow cap 80 removably secured in place by bolts 80'. Toward the front of the machine the base of the housing is extended to form a box-like casing 72", adapted to contain certain of the operating mechanisms and closed on its front side by a removable cover plate conveniently formed with a lower section 81 and an upper section 81'.

At its forward end, that is, its end adjacent the pedestal, the container is provided with a suitable chuck by means of which the pipe or other work is operatively locked to the container. This chuck may be of any suitable construction, though I prefer to use one having a plurality of radially movable jaws 82 supported in an annular plate 83 having a rearwardly extending flange which is screwed into a bushing 84 seated in the end of the container and rigidly secured thereto. As the interior diameter of the container is desirably somewhat greater than the exterior diameter of the largest pipe which the machine is intended to accommodate, the interior of the bushing 84 may preferably be inwardly and forwardly beveled (Fig. 4) so as to assist in guiding the end of the pipe into the chuck when the pipe is pushed forward through the container, and as the bushing is frequently subjected to the impact of the end of the pipe it is advantageous to make it removable as shown instead of integral with the container so that if it becomes damaged it may be readily replaced. The jaws of the chuck are arranged to be moved in and out by rotation of a grooved cam ring 85 provided with spanner holes for the introduction of a suitable tool to obtain the desired leverage for rotating it and cooperative with rollers 86 mounted on pins 87 secured to the jaws in such manner that when the ring is turned in one direction, the jaws will be forced inward to grip the work and when turned in the other direction will be withdrawn therefrom so as to free the work and permit its removal from the machine. Chucks of this general character are of well known construction and in common use.

For a purpose to be hereinafter described, a ring 88 is mounted around the annular chuck member 83 and held thereon by a collar 89 threaded onto the nose of the member, the ring being provided with spaced peripheral flanges forming a groove 90 between them. This ring is extended rearwardly beyond the flange which forms the rear wall of the groove so as to abut against a flange 70′ on the end of the container in which position it is maintained by the collar 89 when the latter is screwed into position; thus ring 88 is constrained to move longitudinally as well as to rotate with the container. To facilitate adjustment of cam ring 85, the ring 88 is cut away segmently at different points above ring 85 so as to expose the latter and permit access to the spanner holes in it as clearly shown in Figs. 2 and 4.

It will of course be understood that when positioning the pipe in the machine preparatory to its being threaded, the pipe is pushed forwardly through the container, bushing and chuck for a suitable distance to expose the end which is to be threaded and then clamped firmly by the chuck so as to turn therewith and in turn with the container, the opposite end of the pipe being supported in any suitable manner to permit the requisite rotation of the pipe. Preferably a limiting stop 91 is secured to the pedestal in position to engage the end of the pipe and arrest its movement through the container so that consecutive pieces of pipe will be projected the same distance beyond the container and thus occupy the same relative position with respect to the cutters.

Container driving mechanism

Rotation of the container within its housing is effected through the medium of a worm gear 100 which is splined to the container so as to turn therewith while permitting longitudinal movement of the container with respect thereto; this worm gear is in constant meshing engagement with a worm 101 mounted on the container drive shaft 102 which is journaled for rotation beneath the container and extends at right angles to its axis. This shaft, together with the master nut driving shaft and other parts to be presently described, may be mounted in a suitable frame 103 so formed and of such shape that after the shafts and other parts are assembled in it, the frame may be slid into the lower part of the housing through the opening in the front thereof which is thereafter closed by the covers 81, 81′, levelling screws 104 being arranged to properly support and align the frame. This materially enhances convenience of manufacture as it enables the necessary machine work and assembly to be done much more readily than would be the case if the frame were not employed and the shafts were journaled directly in the housing.

The worm 101 is keyed to shaft 102 so as to always turn therewith and is provided with an integral clutch-half 105 adapted for engagement by a double faced clutch 106 slidably mounted on a sleeve 107 rotatably disposed on the shaft; on this sleeve is rotatably mounted a gear 108 whose face adjacent the double faced clutch is provided with a clutch-half 109 adapted to cooperate therewith. Adjacent gear 108 a worm drive gear 110 is keyed on the sleeve, this gear being cooperative with a worm 111 disposed below shaft 102 upon a power shaft 112 which extends through the wall of the frame 103 and the housing and is connected through spiral gears 113, 113′ housed in a casing 114 secured to the housing with a drive shaft 115 extending vertically to a point above the housing where it is connected through suitable gears housed in a casing 116 and a train of reduction gears housed in a casing 117 with a driving motor DR mounted on the housing cap. Thus when the motor DR is in operation and the double faced clutch engaged with clutch-half 105, worm 101, and in turn the container, will be driven from the motor through drive shaft 115, power shaft 112, worm 111, worm drive gear 110 and the double faced clutch which in the aforesaid position locks worm 101 to sleeve 107, while when the double faced clutch is disengaged from the clutch-half 105 as in Figs. 11 and 13, worm 101, worm gear 100 and the container with its attached parts will remain stationary even though sleeve 107 be rotating.

For manually effecting the engagement of the double faced clutch with the clutch-half 105 so as to start the rotation of the container, the double faced clutch is provided with a groove in which the arms of a fork 120 are seated; this fork is secured to a sliding shaft 121, mounted in lugs 122 carried by the frame 103 and which extends toward the front of the machine but terminates short of the cover 81′, secured to which is a hollow boss 123 in which is slidably mounted a spring pressed operating plunger 124 carrying an operating knob 125 and aligned with the shaft 121 in such manner that when pushed inwardly it will move the operating shaft rearwardly so as to engage the double faced clutch with the clutch-half 105.

Container translating means

Since the threading cutter which I employ is devoid of pitch it is requisite in order to form a continuous thread to effect relative longitudinal movement between the work and the cutter while the work and cutter are rotating relatively to each other, each on its own axis, and to this end I therefore provide means for moving the container axially for the requisite distance with respect to the cutter, said means comprising a suitable master nut and screw, having, preferably, threads of a pitch greater than the pitch of the thread which is to be formed. Thus, for example, if the thread is to be formed with a pitch of ten to the inch, I prefer to utilize a master nut and screw having a pitch of one to the inch so that the necessary longitudinal movement of the work with respect to the cutter may be obtained by effecting a relative rotation of the container and master screw (which operate as a unit) on one hand and the nut on the other through less than a complete revolution. Under such conditions, when forming a tenpitch thread and utilizing a master screw with a pitch of one to the inch, relative revolution of the screw with respect to the nut amounting to one-tenth of a complete revolution is effective to move the screw and container longitudinally with respect to the nut for one-tenth of an inch which is the amount which the work must be moved longitudinally with respect to the cutter for each complete revolution made by the work in order to produce the desired helical thread. One of the advantages arising from the employment of a master screw and nut having threads of greater pitch than the pitch of the thread to be formed is that errors in the master threads instead of being directly produced in the thread in the work are only communicated thereto and reproduced therein in the ratio which the pitch of the latter bears to that of the former, resulting in a decided minimization of error in the finished thread; additionally, as a practical matter it is ordinarily easier to accurately machine a master screw and nut having threads whose convolutions are of relatively great cross sectional area than when the convolutions are finer, as they must be when corresponding directly with those of the thread to be formed, while under operative conditions the large area of contact between the threads of the relatively moving master screw and nut minimizes the wear between the parts. Thus the accuracy of the master threads can ordinarily be made initially greater and can be preserved for a much longer period of time with corresponding resulting accuracy in the threads produced in the work where the pitch of the master thread is made greater than that of the thread to be formed than is the case where the pitch of the master thread is similar to that of the latter.

I therefore provide the container with an annular master thread which is formed on the outer face of a ring 130 surrounding and keyed to the container so as to rotate therewith, the pitch of this thread for the reasons above stated being preferably greater than that of the thread which is to be formed. The master screw which may be either single or multiple and of any cross sectional form is cooperative with a correspondingly internally threaded annular nut 131 disposed within the housing and prevented from longitudinal movement by thrust bearings 132. Upon the outer periphery of the nut is formed a worm gear which is at all times in meshing engagement with a worm 133 keyed on the master nut drive shaft 134 which extends in the frame 103 parallel to the container drive shaft and is supported for revolution in suitable bearings mounted in that frame.

Since for the reasons already explained it is necessary while the threading cutter is operating on the work to cause a predetermined longitudinal movement thereof relative to the cutter for each revolution of the work, means are provided by which the master nut will be driven through the worm 133 in correspondence with the rotation of the container but at a somewhat slower rate when a master screw of greater pitch than the thread to be formed is employed, so that the revolving container will be caused to progress gradually with respect to the nut in a longitudinal direction. Thus (Fig. 6) the means for driving the nut while the thread is being formed may comprise a gear 135 keyed to shaft 102 and meshing with an idler gear 136 disposed at one end of a sleeve 137 rotatably mounted on a short shaft 138 located between shafts 102 and 134 and supported in suitable bearings, this idler gear in turn meshing with another gear 139 rotatably mounted on shaft 134. Splined to and capable of limited longitudinal movement on shaft 134 adjacent the rear end of gear 139 is an over-running clutch 140 having its face provided with clutch teeth cooperative with similar teeth on the face of the gear and so designed that when the gear is driven through gears 135 and 136 from the container drive shaft 102 the respective teeth will engage each other and lock the over-running clutch to gear 139, the former being continually pressed toward the gear by a coil spring 141 surrounding the shaft, but when the clutch is itself driven through shaft 134 as hereinafter described, the teeth of the clutch will ride over the teeth of the gear. Hence rotation of shaft 102 is communicated to shaft 134 through gears 135, 136 and 139 and over-running clutch 140 in such manner as to cause shaft 134 to rotate in the same direction as shaft 102 but the ratio of the gears in the train is so designed as to cause shaft 134 to turn at a slower rate than shaft 102; thus when the master screw is of ten times the pitch of the thread to be formed the ratio of the gears is such as to turn shaft 134 through nine-tenths of a revolution for each complete revolution of shaft 102 so that for each revolution of the container (which is driven from shaft 102), the master nut (which is driven from shaft 134) will make but nine-tenths of a revolution, in consequence of which the container during each complete revolution will move longitudinally of the nut for a distance equal to one-tenth the pitch of the master screw.

It will be apparent that by changing the ratio of the train of gears between shafts 102 and 134 the amount of longitudinal progression of the container for each complete revolution thereof may be readily varied and thus that a thread of different pitch may be produced on the work without changing the master thread. Therefore to facilitate adjustment of the machine for the production of threads of two different pitches in this manner I dispose on shaft 102 a gear 135' and on shaft 134 a gear 139' corresponding respectively to gears 135 and 139 but having a different number of teeth from said gears and provide on the other end of sleeve 137 an idler gear 136' adapted to connect gears 135' and 139' when disposed between them. As the sleeve 137 is prevented in any suitable way from longitudinal movement on shaft 138 and the shaft, which is extended out of the housing and provided with a knob 137' for convenient manual operation, arranged to be slid endwise in its supporting bearings, it will be apparent that either of the idler gears 136, 136' may be thrown into mesh as desired thus giving a different speed ratio between shafts 102 and 134. A spring pressed stop pin 142 may be so arranged that its point will project into a slot 143 in shaft 138 provided with recesses at its ends adapted to receive the point of the pin so that when the latter is in either of the recesses, the shaft will be held in the proper position to align either the gear 136 or the gear 136' with the other gears of the train of which it is designed to form a part.

Container returning means

A machine constructed in accordance with the preferred embodiment of my invention is so arranged that the work P will be moved to the left when viewed as in Figs. 1 and 2 while a right hand thread is being cut and in the said figures the parts are shown in the position which they occupy after the work has been inserted in the machine but before the cutters are moved to engagement therewith. Since the work and the container move to the left during the cutting operation it is therefore necessary to provide means for returning the container to initial or starting position from the position which it occupies when the thread is finished and while such means may be of any convenient form, it is however extremely desirable that they be of such character as to always return the container the same distance and then bring it to rest as by so doing the movement which the container undergoes while the thread is being cut will always be initiated from exactly the same point for each successive threading cycle with resulting accuracy and similarity in the threads produced on consecutive pieces of work.

The container returning means which I prefer to employ are so designed as to impart to the container the requisite return or forward movement by rotating the nut 131 while the container is positively prevented from rotation, this rotation of the nut being in the same direction as during the threading operation but preferably at a higher speed so as to provide a quick return. With this end in view a small idler gear 146 is mounted on a stub idler shaft 147 for constant meshing engagement with gear 108; this idler gear in turn meshes with a gear 148 keyed to and near the forward end of shaft 134, longitudinal movement of the gear on the shaft being prevented by spacer sleeves 149. Thus, when the double faced clutch 106 is moved forward so as to engage the clutch-half on gear 108, the motion of sleeve 107 will be transmitted through gears 108, 146 and 148 to shaft 134 to cause the same to turn in the same direction in which it turned during the threading operation, but preferably, owing to the ratio of the gear train just referred to, at a somewhat higher speed, with consequent rotation of worm 133 and master nut 131. However, as the double faced clutch is now out of engagement with clutch-half 105 through which the drive of the container drive shaft 102 is normally effected, the latter is held stationary through the intermeshing engagement of worm 101 and worm gear 100 thus positively locking the container against rotation, with the result that the rotation of the master nut which is itself prevented from longitudinal movement imparts a movement of longitudinal translation to the container so as to move it bodily forward to the position which it initially occupied at the commencement of the threading operation. Upon its arrival at such position, the double faced clutch is automatically disengaged from the clutch-half 109 by means presently to be described, thereby bringing the container to rest. During this return movement of the container and while the drive of shaft 134 is being effected through the gear train 108, 146 and 148 the teeth of the over-running clutch member 140 overrun the teeth on gear 139, which latter is held stationary with shaft 102, spring 141 yielding sufficiently to produce this result.

After the introduction and chucking of the work and at the commencement of the threading operation proper, the double faced clutch, as hitherto stated, is manually moved from neutral position (Fig. 13) into engagement with clutch-half 105 (Fig. 14) by means of the operating knob 125 and remains in such engagement until the thread is completed, but immediately thereafter the double faced clutch is automatically disengaged from clutch-half 105 and moved into engagement with clutch-half 109 (Fig. 15) so as to effect the return of the container to initial or starting position after which the double faced clutch is automatically moved out of engagement with clutch-half 109 to neutral position so as to stop the motion of both shafts 102 and 134 at the completion of the threading cycle; the means which I prefer to employ for automatically effecting these movements of the double faced clutch will now be described:

Pivoted to a boss 150 on frame 103 is a generally L-shaped latch lever 151 having at one end a hooked toe 151′ adapted to engage over the lower corner of a lug 152 pinned to the sliding shaft 121. At its other end, the latch lever is connected to a spring 153 in turn connected to a pin 154 disposed on shaft 121 in such manner that when the shaft is pushed inwardly the spring will tend to raise the lever so as to engage its hooked toe over lug 152 and thus hold the shaft in inward position to maintain the double faced clutch in engagement with clutch-half 105 (Fig. 14). Surrounding shaft 121 and disposed between one of the lugs 122 in which it is mounted and a collar 155 secured to the shaft is a compression coil spring 156 which operates to move the shaft outwardly when the latch lever is disengaged from lug 152 so as to bring the double faced clutch into engagement with the other clutch-half 109 as in Fig. 15. That arm of the latch lever to which spring 153 is connected carries a transversely extending pin 157 which extends between two limit stops 158 and 158′ disposed on the shaft and which, when the latter is reciprocated, operate to positively move the lever into and out of lug-engaging position. The extent of longitudinal movement permitted to shaft 121 is regulated by a stop pin 159 carried by one of the shaft supporting lugs and working in a slot 159′ formed in the shaft. It will thus be apparent that when the shaft is pushed manually inward through the medium of knob 125 to engage the double faced clutch with clutch-half 105, latch lever 151 thereafter operates to maintain such engagement until it is positively forced away from lug 152 by means now to be described, thereby permitting spring 156 to move the shaft in the opposite direction that is, outwardly, to engage the double faced clutch with the clutch-half 109.

Positioned between shafts 102 and 134 and in a plane considerably thereabove is a bracket 160 horizontally bored for the passage of a shaft 161 surrounded by a bushing 162 non-rotatable with respect to the bracket, which latter is provided with a supporting base 160′ secured to a horizontal web integral with the cover 81. Shaft 161 projects over shaft 121 and carries aligned therewith a depending forked finger 163 whose free end depends over shaft 121 and thus lies in the path of lug 152.

The container drive shaft 102 is extended to a point adjacent the forward extremity of frame 103 to there support a worm 165 which meshes with a gear 166 disposed above the worm and journaled for rotation on the adjacent end of bushing 162 which projects beyond the end of bracket 160. In like manner shaft 134 is continued forwardly to support a worm 167 meshing with a worm gear 168 disposed thereabove and journaled for rotation on bushing 162 beyond the opposite end of bracket 160. To the inner face of this gear 168 is bolted a cycloidal gear 169 meshing with a gear 170 mounted on a shaft 171 journaled on and outside of the cover 81′ which is desirably provided with a pocket for the reception of gear 170. Shaft 171 extends horizontally in the general direction of the pedestal and is connected through a telescopic shaft 172 and universal joints 173 with a shaft 174 journaled in the base of the pedestal and carrying a gear 175 meshing with another gear 176 keyed to the hub of the timing disc 177 which is rotatably mounted on a stud shaft 178 carried by the base of the pedestal, the arrangement being such that the timing disc lies in a vertical plane and adjacent the rear face of the former. Thus the timing gear, through the medium of the mechanism just described, is rotated whenever gear 168 revolves and as this gear is always in motion whenever shaft 134 is revolving it will be apparent that the timing disc may be employed, as hereinafter more fully described, to cause the various elements of the machine to perform their respective functions in properly timed relation with each other, the ratio of the gearing through which the timing disc is actuated being so calculated that the disc makes one complete revolution for each complete threading cycle.

For tripping the latch lever 151 so as to release its engagement with lug 152 and permit the double faced clutch to be thrown out of engagement with clutch-half 105 and into engagement with clutch-half 109, a dog 180 is loosely mounted on the hub of gear 166 and the face of the gear provided with two pins 181, 182 on opposite sides of the free end of the dog. The dog is also provided with a lug 180' to which is connected a spring 183 in turn connected to a lug on the face of the gear in such manner that the spring constantly tends to pull the lug in the direction in which the gear revolves and against pin 182, the dog, of course, through its connection with the gear being normally carried around with the latter. The dog is of such shape that the path described by its free end as it is carried around with the gear is intersected when the latch lever is raised by a trip lug 184 suitably positioned on the latch lever; consequently when the dog is brought into engagement with the trip lug through the rotation of gear 166, further motion of the dog is temporarily arrested as the tendency of spring 183 to pull the dog around with the gear is normally insufficient to overcome the resistance to such movement of the dog which is exerted by the latch lever under the influence of spring 153. Thus after the dog has engaged the trip lug, as in Fig. 14, further movement of gear 166 causes pin 182 to gradually move away from the dog and pin 181 to approach and finally engage it after which the dog is positively carried around with the gear so as to trip latch lever 151 and release shaft 121 which is then immediately moved by spring 156 to disengage the double faced clutch from clutch-half 105 and carried into engagement with clutch-half 109; this action through the outward movement of lug 152 is also operative to swing the forked finger 163 slightly about its axis so as to dispose the finger in somewhat angular position with its free end resting against the lug. Of course as soon as the dog passes over the trip lug of latch lever 151, spring 183 is immediately operative to pull the dog around so as to reengage it with pin 182. It will therefore be understood that the revolution of gear 168 is effective to first bring dog 180 into engagement with trip lug 184; that the gear then moves independently of the dog through a limited arc while spring 183 yields somewhat, that the dog is then positively moved by pin 181 so as to trip lever 151, that the dog after passing over the trip lug is again pulled into engagement with pin 182, and further, that this automatic shifting of the double faced clutch from container-driving to container-returning position is timed to occur at the moment when the container reaches the extremity of its outward travel following completion of the formation of the thread on the work.

After the double faced clutch has been engaged with clutch-half 109, thus setting in motion the container returning mechanism, it is requisite to automatically disengage the said clutch and return it to neutral position (Fig. 13) as soon as the container has completed its return movement. This function is effected primarily through the medium of the forked finger 163 by moving the latter in a counter clockwise direction from the position shown in Fig. 15 so as to force shaft 121 to the right. For this purpose a cam disk 190 also journaled on bushing 162, is connected to the outer face of worm gear 168, preferably in such a way as to admit of a certain amount of rotational adjustment between the cam and the gear as, for example, by providing the gear with a stud 191 projecting through a slot 192 in the cam and having a head 191' through which is loosely extended an exteriorly threaded link 193 whose opposite end engages over a pin 194 secured to the cam. On opposite sides of the stud head 191' the threaded portion of the link is provided with adjusting nuts by means of which the distance between the center of the stud and the center of the pin may be readily varied so as to turn the cam relatively to gear 168 in either direction for an amount determined by the length of slot 192; when the desired position of adjustment of the cam with respect to the gear is thus effected, the cam and gear may be locked together so as to move as a unit by setting up the adjusting nuts against the head of the stud. Beyond the end of bushing 162 arm 195 is connected at one end to the projecting end of shaft 161 and at the other to a link 196 in turn connected to another link 197 pivoted on a bracket 198 mounted on the flange of cover 81, pivot pin 199 at the point of connection between links 196 and 197 being operative to support a cam roll 200 cooperative with the peripheral face of cam 190. This latter is so formed that the major portion of its circumference follows the arc of a circle having its center coincident with the axis of shaft 161 and of such radius that when cam roll 200 is riding upon it arm 195 is turned so that finger 163, connected to the other end of shaft 161, is in the position shown in Fig. 13, that is, a position in which through its engagement with lug 152 the double faced clutch is held out of engagement with clutch-half 109, and as spring 156 is continuously operative to urge the shaft in the direction of the arrow in said figure the clutch is thus maintained in neutral position; moreover, as spring 156 is always in a state of compression, it constantly tends to turn finger 163 in a clock-wise direction with the result that roll 200 is caused to continuously follow the face of cam 190.

At a proper point in its periphery this cam is provided with a depression or low point 190' of such depth and configuration that when the roll enters therein finger 163 is permitted to move slightly in a clockwise direction to substantially the position shown in Fig. 15, thus allowing the double faced clutch to engage clutch-half 109 and remain in such engagement during the return of the container. When the double faced clutch is moved forward to engage clutch-half 105 lug 152 moves out of engagement with finger 163 (Fig. 14) and remains in that condition until shaft 121 moves back upon the disengagement of the double faced clutch.

It will be apparent that shaft 121 may be moved so as to engage the double faced clutch with clutch-half 105 irrespective of the point at which roll 200 bears on cam 190 although under normal conditions this engagement of the clutch with clutch-half 105 is effected when roll 200 is approximately in the position shown in Fig. 16, that is just entering on the high point of the cam. Under such normal conditions the longitudinal movement of the container away from the pedestal continues after the clutch engagement is effected throughout the period when the roll is riding on the high part of the cam but as soon as the roll enters on the lower part thereof, the double faced clutch is disengaged from clutch-half 105 and engaged with clutch-half 109 so as to initiate return of the container as heretofore explained; the return movement then continues while the roll traverses the low part of the cam but is arrested as soon as the roll again reaches the high part of the cam and finger 163 throws the double faced clutch to neutral position. Therefore if the double faced clutch due to breaking of spring 156 or other cause should be accidentally thrown out of engagement with clutch-half 105 at any time before the container has reached the end of its outward travel, finger 163 operates to block the clutch from moving towards clutch-half 109 sufficiently far to engage it and thus initiate the container return since under such conditions roll 200 is riding on the high part of cam 190 and thus holds the finger rigidly in the path of lug 152. This feature I deem of considerable importance, for in its absence it is conceivable that the container return might be in some way accidentally initiated before the container had completed its normal outward movement which would result in the container being returned too far with possible resulting damage to the machine. In like manner, the cam and finger operate to insure the positive disengagement of the double faced clutch from clutch-half 109 whenever the container reaches the end of its normal return movement thus rendering it impossible for the container to over-run and automatically bringing it to rest at the same point following each return movement; thus at the conclusion of each return movement the container occupies exactly the same relation to the cutters, with the result that the latter begin to operate at the same point with respect to the end of each consecutive piece of work after it has been chucked in the machine with its end in engagement with limit stop 91.

*Threading cutter compensating means*

The radial magnitude of consecutive portions of a tapered thread gradually increases as the thread proceeds from its smallest to its largest end and it is therefore desirable to compensate for this increase to insure the production of an absolutely perfect and smooth thread. In the machines disclosed in my said Patent #1,611,122 and in my said application Serial #151,281, I explained one manner of effecting this compensation by slightly inclining the axis of the work to the axis of the threading cutter so that during the operation of the latter a combined rotative, longitudinal and gradual radial movement would be imparted to the work with respect to the threading cutter. In the present machine I prefer to effect the same result in a slightly different manner, namely, by gradually feeding the threading cutter radially into the work while maintaining the axes of the cutter and work parallel. If the work is being moved longitudinally from the larger end toward the smaller end of the tapered cutter (as in the present machine when forming a right hand thread) the radial feed of the latter should be toward the axis of the work so as to gradually move the cutter inwardly toward such axis while if the longitudinal movement of the work with respect to the cutter is in the opposite direction, that is, toward the larger end of the cutter, the direction of radial feed of the latter should be reversed so as to move the cutter outwardly from said axis.

The mechanism which I prefer to employ for effecting this radial feed comprises the cam roll 64 and cam 65, to which reference has already been made. As shown in Fig. 17, cam 65 is mounted on a vertically extending cam shaft 205 journaled in the top of the pedestal 2; while as shown in Fig. 23 a segment of the peripheral face of the cam has a gradually inclined surface 65' adapted for cooperation with roll 64, the contour of this surface being calculated in accordance with rate of radial feed which it is desired to impart to the threading cutter. Adjacent the lower end of the cam shaft a horizontally disposed lever 206 is secured and provided at its free end with an adjusting slot 207 through which extends a vertical, headed pin 208 projecting above and below the slot to receive collars 209 upon its ends and which respectively lie between the head of the pin and the upper face of the lever and between the lower face of the latter and a clamping nut 209' threaded on to the lower end of the pin in such manner that the pin can be clamped at any desirable point in the slot. The collars 209 are received in the ends of a fork at the end of a link 210 which extends over to a point beneath the groove 90 in the ring 88 carried by the container and is there connected by a pin 211 to a block 212 having a nose extending into the groove 90 and slidable in a slot 213 formed in a supporting bracket 214 bolted to the container housing.

As hitherto explained the container moves longitudinally during the threading operation thus imparting a similar movement as well as one of rotation to the ring 88 resulting in a corresponding longitudinal movement being imparted to block 212 which is operative to pull link 210 in a direction to rotate cam 65 in the direction of the arrow in Fig. 23 while the thread is being cut. Since, as hitherto explained, the inward movement of threading cutter head 5 is limited by engagement of cam roll 64 with cam 65 and more specifically with the operative segment 65' of said cam and as during the cutting of the thread the fluid pressure on the outer face of the piston in cylinder 61 is maintained, cam roll 64 is continuously urged against segment 65' of the cam and as the latter is gradually rotated through the pull of link 210 as the container moves outwardly the threading cutter head 5 is permitted to gradually move inwardly as cam segment 65' moves across the face of the roll, thereby correspondingly moving the threading cutter gradually inward toward the axis of the work. During the return movement of the container, link 210 swings lever 206 in the opposite direction so as to return the cam to initial position; during this return movement of the cam the roll, however, is out of contact therewith because as hereinafter explained the threading cutter head is promptly moved outwardly to initial position on the completion of the thread and prior to the return movement of the container. By adjusting the position of pin 208 in slot 207 the extent of angular rotation of cam 65 during the period required for the longitudinal movement of the container from initial to final position can be varied with consequent variation in the amount of radial feed which will be imparted to the cutter during said period.

*Timing mechanism*

Timing disc 177, as hitherto stated, is so driven as to make one complete revolution for each threading cycle, and is provided on its outer face with a plurality of concentric, radially spaced ridges, conveniently three in number, on which are adjustably positioned a plurality of timing dogs, three of which control the movements of the roughing cutter head 4 and three others the movements of the threading cutter head. When three ridges 215, 216 and 217 are employed, two of the first set of dogs, namely 218, 218' may be disposed on the middle ridge 216 and the other dog 218'' of that set upon the outer ridge 215, and two of the dogs 220, 220' of the other set upon the inner ridge 217 and the other dog 220'' of that set upon the middle ridge. One wall of each ridge may be undercut and the dogs, which are adapted to seat over the ridges, provided with toes cooperative with the undercut grooves so formed to thereby hold the dogs on the ridges, while each dog may carry a countersunk set-screw by means of which it may be held at any point on the ridge on which it is seated. Instead of being continuous, each ridge may be interrupted for a short distance to provide a gap through which the dogs may be slipped endwise upon it when the parts are assembled, the gaps being of course, disposed at points where the dogs never have to be set in the normal operation of the machine.

The timing disc is housed in a cylindrical casing 225 secured to the face of the pedestal and having a removable cover 226, and a supporting bar 227 is arranged to extend horizontally across the outer face of the disc above its center, with its inner face slightly spaced from the tops of the ridges on the disc. This bar, whose ends may be supported on the flanged margin of the casing 225, serves as a point of support for a downwardly depending arm 228 which is forked over the bar at its upper end and pivoted thereto on a pin 229, and also for a corresponding arm 230, similarly forked over the bar at its upper end and pivoted thereto by a pin 231, arms 228 and 230 being respectively disposed on opposite sides of the center of the disc. Arm 228 at a point a little below its pivot is provided with a roller 233 which projects from its inner face into the groove between ridges 216 and 217 in such position that it is engageable by dogs 218, 218' and 218'' when they are respectively carried past it by the revolution of the disc; in like manner arm 230 is provided with a similar roller 235 projecting into the groove between ridges 217 and 219 and engageable by dogs 220, 220' and 220'' when they respectively are carried past the roller. The function of the several dogs is to oscillate arms 228 and 230 about their respective pivot pins and as rollers 233 and 235 are respectively positioned quite close to the pivotal points of their respective arms, relatively slight displacement of either roller is sufficient to cause the lower end of the arm to move through a relatively considerable arc; preferably the leading corners of the dogs are beveled off as indicated to facilitate passage of the dogs past the rollers.

The lower end of arm 228 is connected through a link 240 and lever 241 with a rod 242 controlling the valves of the oil gear pump in the oil gear housing OG and by means of which the flow of oil in pipes 51 is reversed; in a generally similar way the lower end of arm 230 is connected by a link 244 with a rod 245 controlling the valves of the oil gear pump in oil gear housing OG' by means of which the flow of oil in pipes 62 is reversed. If desired, arms 228 and 230 may be provided with spring pressed stops 246 cooperative with depressions formed in lugs 247 and 248 integral with the casing 225 and across the faces of which the arms are respectively arranged to swing, operative to yieldingly hold the arms in vertical position and also at the extremities of their movements in either direction. Thus after either arm is carried to the end of its swing or brought to vertical position through the operation of the control dogs, it will be retained in such position by its stop until engagement of another one of the dogs with the roller of the arm operates to positively move it to another position against the yielding resistance afforded by the stop.

Assuming arm 228 to be in vertical or neutral position, the effective length of its controlling dogs is such that as disc 177 revolves, dog 218 first swings the arm to the left (viewed as in Fig. 20), dog 218'' then swings it to the right past neutral and dog 218' finally returns it to neutral. Similarly dog 220 operates to swing arm 230 from neutral to the right, dog 220'' then swings it to the left past neutral and dog 220' finally returns it to neutral. Obviously the timing of these various movements of the arms is controlled by the setting of the dogs on the timing disc.

Operation

Reference will now be made to the method of operation of a machine constructed and assembled substantially as hereinbefore described when forming a tapered right hand thread on the end of a pipe or tube.

The roughing and threading cutters having been secured on their respective spindles, we will assume the heads 4 and 5 to be at the outer ends of their resepective paths of movement and the container to be at the forward or inner end of its path. The end of the pipe to be threaded, which may if desired be previously provided with an internal supporting plug or the like of any suitable character, is first slid forward through the container until it comes in contact with limit stop 91 and then locked to the container by suitable operation of the chuck and the opposite end of pipe supported in any convenient way so that the pipe is free to rotate. Of course the length of pipe projecting beyond the face of the container when the end of the pipe is against the stop is determined by the distance between the container housing and the pedestal which may be adjusted as required by loosening bolt 73 and rotating adjusting screw 75.

Either before or after the chucking of the work, the several dogs on the timing disc are so set as to bring about the actuation of the oil gear reversing valves at the proper times to effect the requisite movements of the cutter heads 4 and 5 during the cycle, it being understood that at the beginning thereof arms 228 and 230 are in neutral position, and the heads, as stated, at the outer extremities of their paths.

The machine being now in condition for operation and the work in position, current is supplied to the several motors thus setting both cutters revolving as well as drive shaft 115 and, in turn, power shaft 112 and gear 108. The operator by pushing on knob 125 next throws the double faced clutch 106 into engagement with clutch-half 105 thus setting container drive shaft 102 in motion with consequent rotation of the container and work. The rotation of container drive shaft 102 is also effective through gears 135, 136, and 139 to cause rotation of master nut drive shaft 134 but at a slower rate than that at which the container drive shaft is revolving, while as soon as the two drive shafts are set in motion, worm gear 168 also begins to revolve thereby starting timing disc 177. On this disc dog 218 has been so set that it immediately swings arm 228 to the left thus operating the valves controlling the oil flow to cylinder 50 so as to cause the roughing cutter head 4 to move inwardly and thereby bring the roughing cutter R into engagement with the pipe, this movement of the head continuing until the end of shaft 32 strikes limit stop 43 thus bringing the cutter to the desired depth of cut the extent of which has previously been determined by suitable adjustment of shaft 32 by means of crank 42.

The roughing cutter and work now continue their relative rotation until the cutter has traversed a sufficient distance around the work to enable the threading cutter to be brought to operative depth in the clean metal, and as the two cutters are arranged to engage the work at opposite ends of its horizontal diameter the threading cutter must therefore be kept out of engagement with the work until the roughing cutter has operated a little more than half way around its periphery. However, as an appreciable time is required for the threading cutter head to move the threading cutter from initial or retracted position to operative depth in the work, it is desirable that the head begin its inward movement as early as possible in the cycle, the object of course being to bring the threading cutter to operative depth as soon as may be with consequent economization of time. Therefore the dog 220 on timing disc 177 is preferably so set that the valves controlling the flow of oil to cylinder 61 will be operated so as to start the head moving inwardly at such time in the cycle that the threading cutter will reach operative depth in the clean metal exposed by the roughing cut as close as possible to the leading end thereof, the depth to which the cutter can enter the work before its further inward progress is arrested by contact of roll 64 with cam segment 65' having been previously determined by the adjustment of shaft 55 by means of crank 60; this depth of cut is ordinarily so regulated as to be just sufficient to form a full thread.

Both cutters being thus brought to operative depth in the work and the oil pressure being continued in the outer ends of cylinders 50 and 61, the roughing cutter head 4 remains stationary while the relative rotation between the work and the cutter continues until the roughing cutter has completely traversed the periphery of the work after which it can no longer perform any useful function thereon although the threading cutter has not yet completed its duty. The roughing cutter may therefore now be moved out of its operative position and retracted to initial or starting position which result is effected by suitable setting of dog 218'' on timing disc 177 so that after the roughing cutter has finished its cut this dog will operate to throw arm 228 to the opposite end or right hand end of its swing thus reversing the flow of oil to cylinder 50 and causing head 4 to move outwardly, the third dog 218' being also so set that when the head reaches retracted position arm 228 will be moved to neutral position thus shutting off further flow of oil in either direction to cylinder 50 during the balance of the cycle.

In like manner dog 220'' on disc 177 is so set that promptly after the threading cutter has completed its traverse of the work and consequent formation of the thread, arm 230 will be swung to the left so as to reverse the flow of oil to cylinder 61 thus moving head 5 outwardly, dog 220' being also so set that as soon as the head reaches initial or starting position arm 230 is returned to neutral position, thus shutting off further flow of oil in either direction to cylinder 61 during the balance of the cycle.

From the moment when the operating knob 125 is moved to initiate the cycle, the container and work both revolve and move longitudinally and cam 65 is slowly rotated, with the result that after the relatively rapid inward movement of the cutter designed to bring it to operative depth has been checked by engagement of roll 64 with cam segment 65', the head still continues to move inward very gradually as the continued pressure in cylinder 61 forces the cam roll to follow the contour of the rotating cam segment; thus after the cutter has been initially brought to operative depth in the work it is caused to gradually approach the axis of the work in timed relation with the longitudinal progression of the latter as it is moved toward the smaller end of the cutter, thereby compensating for the difference in radial magnitude, to which reference has heretofore been made, in the consecutive portions of the tapered thread. By adjustment of the position of pin 208 in slot 207 with corresponding increase or decrease in the arc through which cam 65 is rotated during the longitudinal movement of the container the amount which the cutter is moved radially with respect to the work while the thread is being cut may be varied in accordance with the taper of the threading cutter and, consequently, of the thread which is to be produced.

Theoretically, the threading cutter might be withdrawn after the work has made exactly one full revolution after the cutter has attained operative depth, but in practice it is desirable to give the work slightly more than such a full revolution in order to prevent any unevenness or inequalities at the points of juncture of those portions of the thread segments formed by the initial operation of the cutter and those formed by its final operation; revolution of the work through an additional arc or overlap of 5° to 10° is ordinarily sufficient for this purpose, and dog 218'' is therefore preferably so set that the retractive movement of head 5 will commence as soon as the work completes this additional rotative movement. Thus the total amount of rotation which is imparted to the work from the time when it is first set in motion until the time when latch 151 is tripped so as to bring about the disengagement of the double faced clutch from clutch-half 105 ordinarily approximates 480°, that is, some 10° while the roughing cutter is moving in to depth, thereafter about 190° before the threading cutter reaches operative depth, then some 370° while the work makes a complete revolution with respect to the threading cutter and the slight overlap above mentioned, plus a further slight amount of say 10° while the threading cutter is being cleared from the work so that the cutter teeth and work will be fully disengaged before the container return is initiated.

Therefore the latch tripping dog 180 is so arranged and cam 190 so adjusted that after the work has been rotated for substantially the amount indicated latch 151 is tripped to initiate the return movement of the container through the engagement of the double faced clutch with clutch-half 109. As hitherto explained the moment the double faced clutch is disengaged from clutch-half 105 the container drive shaft 102 stops revolving thereby, through the coaction of worm 101 and worm gear 100, positively locking the container against rotation, the rotation of master nut drive shaft 134 however being continued through gear 108 and sleeve 107 with consequent continued rotation of worm 133 and master nut 131 to thereby effect the container return during which, owing to the ratio of the gearing through which the rotation of the master nut is brought about, the container is moved longitudinally at a considerably higher speed than during its outward movement with consequent economization of time.

As the container reaches initial or starting position cam roll 200 passes to the low point of cam 190 and finger 163 is moved counterclockwise to throw sliding shaft 121 to the right, thus disengaging the double faced clutch from clutch-half 109 and bringing the container to rest. The cutter heads having already been returned to retracted position (the threading cutter head having completed its return movement thereto during the return of the container) the work may now be unchucked and removed from the machine which is then in condition to receive the next piece of work; during the time required for inserting and chucking the latter the several motors may be continued in operation so as to keep the cutters revolving as well as drive shaft 115 which latter, of course, is inoperative to actuate the container drive or return mechanism so long as the double faced clutch is in neutral position.

In Figs. 24 to 24ᶜ inclusive, I have diagrammatically shown the relation of the cutters and the work at different times in the cycles, as well as their directions of relative rotation in accordance with standard milling practice. Thus in Fig. 24 the work and cutters are shown in their relative positions after the work has been chucked but before either cutter has started to move inwardly; in Fig. 24ᵃ the roughing cutter has been moved to depth in the work but the threading cutter is still out of engagement therewith; in Fig. 24ᵇ both cutters are operating at depth, the roughing cutter now having operated a little more than half way around the work, and it will be noted that the threading cutter is cutting into the work for an amount below the surface of the roughing cut sufficient to form the thread; in Fig. 24ᶜ the roughing cutter, having completed its duty has been moved away from the work to initial position but the threading cutter having not yet fully completed its traverse of the work is still in engagement therewith, but as soon as it has completed such traverse plus the slight overlap to which I have referred, it will be moved out of engagement with the work to assume its initial position as shown in Fig. 24.

While I have herein more particularly referred to the employment of the machine for producing tapered threads, it is to be understood that it may be used with equal facility for the production of straight threads by employing straight instead of tapered cutters and disconnecting link 210 from arm 195 so that cam 65 will remain stationary and thus merely act as a fixed stop to limit inward movement of shaft 55 and in turn head 5 in the same manner that stop 53 normally limits the inward movement of shaft 32 and head 4; under such conditions the threading cutter will merely be moved in for the predetermined distance permitted by the adjustment of shaft 55 to thereby bring it to operative depth in the work and will thereafter remain in such position until the thread is completed instead of being gradually fed radially of the work from such position as during the production of a tapered thread.

Moreover while I have illustrated in the accompanying drawings and described herein with considerable particularity one form of machine constructed in accordance with the present invention, I do not thereby desire nor intend to specifically limit myself thereto for changes and modifications in the design, construction and arrangement of the elements of the machine may be made with a view to adapting the machine for use under various operative conditions or with different classes of work or for such other reasons as may be desired without departing from the spirit and scope of the invention as defined in the appended claims.

Having thus described my invention, I claim and desire to protect by Letters Patent of the United States:

1. A machine for milling threads comprising a rotatable roughing cutter and a rotatable threading cutter having their axes disposed in the same plane, means for holding the work in operative position between the cutters with its axis coincident with said plane and adapted to rotate the work and simultaneously impart thereto a longitudinal movement with respect to the cutters, means for rotating each of said cutters, and means interconnected with said work holding and rotating means operative to feed the roughing cutter to operative depth in the work and after the work has rotated through a predetermined arc with respect to said cutter, to then feed the threading cutter to operative depth in the work and to thereafter withdraw both cutters from the work.

2. A machine as specified in claim 1 in which the means for feeding the cutters toward and away from the work are arranged to first feed the roughing cutter to depth in the work, to then feed the threading cutter to depth in the work after the work has rotated through a predetermined arc with respect to the roughing cutter, to then withdraw the roughing cutter from operative position after the work has made a complete revolution with respect to said cutter, and to then withdraw the threading cutter after the work has made at least a complete revolution with respect thereto after said cutter has been brought to operative depth.

3. A machine as specified in claim 1 embodying means for automatically effecting a quick return of the work to initial position after both cutters have performed their duty thereon and the work has completed at least a complete relative revolution with respect to each cutter after the latter has been moved to operative depth in the work.

4. A machine as specified in claim 1 embodying means for automatically effecting a quick return of the work to initial position by a continuous single movement of translation after the work has completed at least a complete revolution with respect to each cutter after the latter has been moved to operative depth in the work.

5. A machine as specified in claim 1 embodying means for automatically arresting the rotation of the work and then effecting a quick return of the work to initial position by a continuous single movement of translation after the work has completed at least a complete revolution with respect to each cutter after the latter has been moved to operative depth in the work.

6. A machine for milling threads comprising a rotatable roughing cutter and a rotatable threading cutter, means for holding the work in operative position between the cutters and adapted to rotate the work and simultaneously impart thereto a longitudinal movement with respect to the cutters, means for rotating each of said cutters independently on its own axis, means interconnected with said work holding and rotating means operative to feed the roughing cutter to depth in the work and to thereafter feed the threading cutter to depth in the work after the roughing cutter has operated for a predetermined interval thereon, and means operative to thereafter impart to the threading cutter a gradual movement in a radial direction with respect to the work.

7. A machine as specified in claim 6 in which the means for imparting the gradual movement of the threading cutter are so interconnected with the work holding and rotating means that said movement of the cutter is effected in correspondence with the longitudinal movement of the work with respect to said cutter.

8. A machine as specified in claim 6 in which the means for effecting the gradual movement of the threading cutter comprise a cam operating as a stop to limit the main cutter feed and means for gradually rotating the cam in correspondence with the longitudinal movement of the work.

9. A milling machine comprising a pair of cutters, means for holding the work adjacent said cutters in position to be acted upon thereby, means for rotating and longitudinally translating said work holding means to thereby impart corresponding movements of rotation and longitudinal translation to the work, fluid actuated means interconnected with said last mentioned means operative to consecutively and independently feed said cutters toward the work, and means for arresting the movement of said cutters toward the work under the influence of said fluid actuated means when the cutters are respectively brought to operative depth in the work.

10. A machine as specified in claim 9 in which the means for arresting the movement of one cutter are operable to permit a further gradual progressive movement of that cutter under the influence of said fluid actuated means after said cutter has been brought to operative depth in the work.

11. A machine as specified in claim 9 in which the means for arresting the feed of one cutter upon the attainment of operative depth in the work comprises a cam and means operative to gradually rotate said cam in correspondence with the longitudinal movement of the work to thereby permit a further gradual progressive movement of that cutter under the influence of said fluid actuated means in a radial direction with respect to the work after the cutter has been brought to operative depth therein.

12. A machine as specified in claim 9 in which the means for arresting the feed of one cutter upon the attainment of operative depth in the work comprise a cam operating as a stop to limit the feed of said cutter toward the work by said fluid actuated means, and means interposed between said cam and the work holding and rotating means operative to gradually rotate said cam in correspondence with the longitudinal movement of the work to permit a gradual progressive and additional movement of that cutter in a radial direction with respect to the work and while it is operating thereon after it has been brought to operative depth therein by said fluid actuated means.

13. A milling machine comprising means for holding, rotating and longitudinally translating the work, a pair of cutter heads disposed on opposite sides of the axis of the work and independently movable toward and away from said axis, a cutter spindle carried by each head and adapted to afford support to a cutter, means carried by, entirely supported upon and movable with each head for driving its spindle, and means interconnected with said work holding and rotating means operative to move each head together with said spindle driving means toward and away from the work to respectively and consecutively engage and disengage the cutter therefrom in predetermined timed relation with the rotative and longitudinal movements of the work.

14. A machine as specified in claim 13 in which the spindle driving means carried by each head and movable therewith comprise an electric motor mounted on the head.

15. A machine as specified in claim 13 in which the spindle driving means carried by each head and movable therewith comprise an electric motor mounted on the head and worm gearing interposed between the motor and the spindle.

16. A milling machine comprising means for holding, rotating and longitudinally moving the work, a pair of cutter heads each independently movable toward and away from the axis of the work, a cutter and cutter driving means carried by each head and movable therewith, fluid actuated means for effecting the movement of each head comprising a cylinder, a fluid actuated piston therein connected with the head, means for supplying fluid under pressure to the cylinder and means interconnected with the work holding and moving means for controlling said fluid supplying means to thereby move the cutters in timed relation with the movements of the work.

17. A machine as specified in claim 16 in which each of the heads is relatively adjustable with respect to its piston whereby the position of the head with respect to the axis of the work when the piston is in a predetermined position in the cylinder may be varied.

18. A machine as specified in claim 16 in which the connecting means between each piston and the adjacent cutter head comprise a screw, a rotatable nut and means for rotating the nut whereby the distance between the head and the piston may be adjustably varied.

19. A milling machine comprising means for holding, rotating and longitudinally translating the work, a pair of cutter heads independently movable toward and away from the work, means operative to move said heads, and means including a rotatable timing disk operated from said work holding and moving means adapted to actuate said head moving means to move said heads in predetermined timed relation with the movements of the work.

20. A milling machine comprising means for holding, rotating and longitudinally translating the work, a pair of cutter heads independently movable toward and away from the work, fluid actuated means for moving the heads, a rotatable timing disk, means interconnected with said work holding and moving means for rotating the disk, and means including a plurality of adjustable members carried by the disk for controlling the operation of said fluid actuated means so as to move the cutters to and from the work in predetermined timed relation with the movements thereof.

21. A machine as specified in claim 20 in which the timing disk is arranged to make one complete revolution for each complete threading cycle whereby the cutters during the cycle are respectively and consecutively caused to move from a predetermined position to operative depth in the work, then maintained in operative engagement with the work while the work rotates through a predetermined arc with respect to each cutter, and then withdrawn from the work to initial position.

22. A machine for milling threads comprising a rotatable hollow container adapted to receive the work, means carried by the container for gripping the work, means for rotating the container, means including a clutch for throwing said rotating means into and out of operation, a master thread carried by the container, a nut cooperative therewith, means for revolving the nut from the container rotating means while the latter are in operation, means for revolving the nut in the same direction when the container rotating means are inoperative to rotate the container, a pair of cutters, means for moving the cutters to and from the work, and controlling means for said cutter moving means operative to move the cutters into and out of operative position in predetermined timed relation with the movements of the work and including a rotatable timing disk and means interconnected with the nut revolving means for driving said disk.

23. A machine for milling threads comprising a pair of cutters, means for moving the cutters toward and away from each other, a rotatable work holding container adapted to position the work adjacent the cutters, means for rotating the container, a thread carried by the container, a nut cooperative with the thread, means for revolving the nut, means for actuating the nut revolving means while the container is rotating to cause longitudinal movement of the container in one direction with respect to the cutters, means for actuating the nut revolving means when the container is not rotating to move the container in the opposite direction, means for controlling the movements of the cutters in timed relation with the movements of the container and including a timing disk driven from said nut revolving means, and means operative to automatically throw the container rotating means out of operation and to throw said nut revolving actuating means into operation after the container has moved for a predetermined distance in said first mentioned direction.

24. A machine as specified in claim 23 and embodying means operative to prevent the second mentioned actuating means for the nut revolving means from being thrown into operation save when the container is in a predetermined position.

25. A machine as specified in claim 23 in which the means for automatically throwing the container rotating means out of operation and throwing the second mentioned nut revolving means into operation comprise a movable clutch, and having means for preventing the movement of the clutch to a position to throw said second mentioned nut revolving means into operation except when the container has attained a predetermined position in its path of longitudinal movement.

26. A machine for milling threads comprising a pair of spaced cutters, means for moving the cutters toward and away from each other, a rotatable work holding container adapted to hold the work adjacent the cutters, means for rotating the container, a thread carried by the container, a nut cooperative with the thread and restrained from longitudinal movement, means for revolving the nut in the same direction as the container, means for actuating the nut revolving means through the container rotating means when the latter are operating, means for actuating the nut revolving means at a higher speed and independently of the container rotating means when the latter are not operating, means interconnected with said nut revolving means for controlling the operation of the cutter moving means in timed relation to the movements of the container, and means for automatically throwing the container rotating means out of operation and the independent nut revolving means into operation after the container has rotated for a predetermined time.

27. A machine as specified in claim 26 in which said last mentioned means include a sliding clutch, manually movable to throw the container rotating means into operation, means for automatically disengaging the clutch from container rotating position and moving it to a position to throw said independent nut revolving means into operation after the container has moved longitudinally for a predetermined distance in one direction to thereby return the container in the opposite direction, and means for automatically disengaging the clutch at the completion of the return movement of the container.

28. A machine as specified in claim 26 in which said last mentioned means include a clutch manually movable to a position to throw the container rotating means into operation, means for automatically disengaging the clutch so as to stop the operation of the container rotating means after a predetermined interval and for throwing said clutch to a position to start the operation of the independent nut revolving means to return the container to initial position, and means for automatically disengaging the clutch to stop the movement of the container upon its attainment of initial position, together with means operative to prevent movement of the clutch to a position to initiate the operation of the independent nut revolving means before the container has reached a predetermined position in its longitudinal movement.

29. A milling machine comprising a pair of spaced cutters, fluid actuated means for moving the cutters toward and away from each other, a rotatable work holding container adapted to hold the work adjacent the cutters, means for rotating the container, means for imparting a longitudinal movement to the container in one direction while it is rotating and for effecting a return of the container by a longitudinal movement of translation in the opposite direction while said container is not rotating, and means actuated from said last mentioned means for controlling the operation of said fluid actuated means so as to move the cutters in predetermined timed relation with the movements of the container.

30. A milling machine comprising means for holding, rotating and longitudinally translating the work, a pair of cutter heads disposed on opposite sides of the axis of the work and independently movable toward and away from said axis, a cutter spindle carried by each head and adapted to afford support to a cutter, means carried by each head and movable therewith for driving its spindle and comprising an electric motor, a worm driven by the motor and a worm gear mounted on the spindle in meshing engagement with the worm and of relatively large diameter with respect to the diameter of the cutter carried by the spindle, and means interconnected with said work holding and rotating means operative to move each head toward and away from the work to respectively engage and disengage the cutters therefrom in predetermined timed relation with the rotative and longitudinal movements of the work.

31. A milling machine comprising two independently rotatable cutters having their axes disposed in the same plane, means for holding the work in operative position adjacent the cutters with its axis coincident with said plane and adapted to rotate the work, and means interconnected with said work holding and rotating means operative to first feed one cutter to depth in the work, to then feed the other cutter to depth in the work after the work has rotated through a predetermined arc with respect to the first cutter, to then withdraw the first cutter from operative position after the work has made at least a complete revolution with respect to said cutter, and to then withdraw the second cutter after the work has made at least a complete revolution with respect thereto after said cutter has been brought to operative depth.

In witness whereof, I have hereunto set my hand this 28th day of October, 1927.

GEORGE E. MIRFIELD.

Certificate of Correction

Patent No. 1,745,035.  Granted January 28, 1930, to

GEORGE E. MIRFIELD

It is hereby certified that error appears in the printed specification of the above numbered patent requiring correction as follows: Page 4, line 61, for "nut 35" read *nut 35"*; same page, lines 63 and 64, strike out the phrase "whereby endwise movement of the latter is prevented" and insert the same to follow after the word "sleeve," first occurrence, line 62; and that the said Letters Patent should be read with these corrections therein that the same may conform to the record of the case in the Patent Office.

Signed and sealed this 11th day of March, A. D. 1930.

[SEAL]

M. J. MOORE,
*Acting Commissioner of Patents.*